United States Patent
Zhu et al.

(10) Patent No.: US 12,096,409 B2
(45) Date of Patent: Sep. 17, 2024

(54) RANDOM ACCESS PROCESSING METHOD AND APPARATUS

(71) Applicants: Beijing Xiaomi Mobile Software Co., Ltd., Beijing (CN); BEIJING UNIVERSITY OF POSTS AND TELECOMMUNICATIONS, Beijing (CN)

(72) Inventors: Yajun Zhu, Beijing (CN); Wei Hong, Beijing (CN); Tong Sha, Beijing (CN); Yong Li, Beijing (CN)

(73) Assignees: Beijing Xiaomi Mobile Software Co., Ltd., Beijing (CN); Beijing University of Posts and Telecommunications, Beijing (CN)

( * ) Notice: Subject to any disclaimer, the term of this patent is extended or adjusted under 35 U.S.C. 154(b) by 775 days.

(21) Appl. No.: 17/261,327

(22) PCT Filed: Jul. 20, 2018

(86) PCT No.: PCT/CN2018/096476
§ 371 (c)(1),
(2) Date: Jan. 19, 2021

(87) PCT Pub. No.: WO2020/014967
PCT Pub. Date: Jan. 23, 2020

(65) Prior Publication Data
US 2021/0266901 A1    Aug. 26, 2021

(51) Int. Cl.
H04W 72/0453    (2023.01)
H04W 74/0833    (2024.01)

(52) U.S. Cl.
CPC ... H04W 72/0453 (2013.01); H04W 74/0833 (2013.01)

(58) Field of Classification Search
CPC ........ H04W 72/0453; H04W 74/0833; H04W 74/0808; H04W 74/002
See application file for complete search history.

(56) References Cited

U.S. PATENT DOCUMENTS

| 2015/0057011 A1* | 2/2015 | Di Girolamo .... H04W 72/0446 455/454 |
| 2017/0332410 A1* | 11/2017 | Babaei .............. H04W 72/0446 |

(Continued)

FOREIGN PATENT DOCUMENTS

| CN | 106937404 A | 7/2017 |
| WO | WO 2017197166 A1 | 11/2017 |
| WO | WO 2018031300 A1 | 2/2018 |

OTHER PUBLICATIONS

NTT R1-162803: Discussion on PRACH for eLAA UL Apr. 2016 (Year: 2016).*

(Continued)

*Primary Examiner* — Rina C Pancholi
(74) *Attorney, Agent, or Firm* — Finnegan, Henderson, Farabow, Garrett & Dunner, L.L.P.

(57) ABSTRACT

The present invention relates to a random access processing method and apparatus. The method includes: monitoring, on at least one carrier in a pre-configured first carrier group, whether a time-frequency resource for transmitting a physical random access channel (PRACH) is idle, wherein the first carrier group comprises at least two carriers; and when there is an idle time-frequency resource for the PRACH, sending a random access preamble on the idle time-frequency resource for the PRACH to request random access.

16 Claims, 19 Drawing Sheets

(56) References Cited

U.S. PATENT DOCUMENTS

| | | | | |
|---|---|---|---|---|
| 2018/0167901 A1* | 6/2018 | Wang | ................ | H04W 56/0045 |
| 2018/0255578 A1* | 9/2018 | Kim | .................. | H04W 74/0808 |
| 2019/0190661 A1* | 6/2019 | You | ................... | H04W 74/0833 |
| 2019/0254077 A1* | 8/2019 | Sahlin | .................... | H04L 5/0092 |
| 2020/0367288 A1* | 11/2020 | Dahlman | .......... | H04W 74/0833 |

OTHER PUBLICATIONS

Extended European Search Report in Application No. 18926523.4, issued Jul. 22, 2021.

English version of Search Report and Written Opinion of the International Searching Authority Issued in Application No. PCT/CN2018/096476, mailed Apr. 12, 2019.

NTT Docomo, Inc., "Discussion on PRACH for eLAA UL", 3GPP TSG RAN WG1 Meeting #84bis, R1-162803, Busan, Korea, Apr. 11-15, 2016, 5 pages.

European Patent Office, Communication issued in Application No. 18926523.4, dated Jul. 27, 2023, 4 pages.

* cited by examiner

RANDOM ACCESS PROCESSING METHOD AND APPARATUS

CROSS REFERENCE TO RELATED APPLICATIONS

This application is a national phase application based on International Application No. PCT/CN2018/096476, filed Jul. 20, 2018, the content of which is incorporated herein by reference.

TECHNICAL FIELD

The present disclosure relates to a field of communication technology, and particularly to a method and an apparatus for processing random access.

BACKGROUND

In the related art, the industry has recently conducted a project study on 5G (5th generation mobile communications) unlicensed spectrum and has proposed a solution to support individual networking of a 5G unlicensed cell. It is necessary to follow an LBT (Listen Before Talk) mechanism on an individual networking design of 5G unlicensed spectrum. That is, channels need to be monitored before sending a message regardless of uplink and downlink in the random access process. If there are no available time-frequency resources, the time delay will be increased and the efficiency of random access will be affected.

SUMMARY

A method and an apparatus for processing random access are provided by embodiments of the present disclosure. The technical solutions are described as follows.

According to a first aspect of embodiments of the present disclosure, a method for processing random access is provided, including:
  monitoring whether time-frequency resources for transmitting a physical random access channel (PRACH) are idle on at least one carrier of a pre-configured first carrier group, wherein the first carrier group includes at least two carriers; and
  sending a random access preamble on an idle time-frequency resource for the PRACH when the idle time-frequency resource for the PRACH exists, to request random access.

The technical solution according to embodiments of the present disclosure may include the following beneficial effect: a plurality of carriers are configured for the user device to transmit the preamble in this embodiment. As such, there is a greater probability of idle time-frequency resource for the PRACH and a random access request may be better processed and time delay is reduced.

In an embodiment, before monitoring whether the time-frequency resources for transmitting the PRACH are idle, the method further includes:
  receiving a first system information block sent by a base station side, the first system information block including indication information of the first carrier group and indication information of the time-frequency resources for the PRACH on the at least one carrier of the first carrier group.

The technical solution according to embodiments of the present application may include the following beneficial effect: the first carrier group in this embodiment is pre-configured for the user device through the first system information block, which allows flexible configuration of the first carrier group through the first system information block.

In an embodiment, the method further includes:
  monitoring a random access response (RAR) message sent by a base station side on at least one carrier of a pre-configured second carrier group, wherein the second carrier group includes at least two carriers;
  receiving the RAR on the carrier of the second carrier group; and
  decoding the RAR with a random access radio network temporary identifier (RA-RNTI), wherein the RA-RNTI is determined based on the idle time-frequency resource for the PRACH and the carrier where the idle time-frequency resource for the PRACH is located.

The technical solution according to embodiments of the present disclosure may include the following beneficial effect: a plurality of carriers in this embodiment are configured to transmit the RAR. As such, there is a greater probability of idle time-frequency resource for the RAR and the RAR may be better transmitted and time delay is reduced. Therefore, the user device needs to monitor the plurality of carriers to receive the RAR. Moreover, the RA-RNTI is determined based on the carrier, which facilitates reducing conflict.

In an embodiment, before monitoring the RAR message sent by the base station side, the method further includes:
  receiving a second system information block sent by the base station side, the second system information block including indication information of the second carrier group.

The technical solution according to embodiments of the present disclosure may include the following beneficial effect: the plurality of carriers of the second carrier group in this embodiment are pre-configured through the second system information block, which allows flexible configuration of the second carrier group through the system information block.

In an embodiment, the second system information block further includes indication information of time-frequency resources for the RAR.

The technical solution according to embodiments of the present disclosure may include the following beneficial effect: the time-frequency resources for the RAR may be pre-configured in this embodiment, so that the user device better monitors the RAR.

In an embodiment, the RAR includes indication information of time-frequency resources for a random response message 3 on at least one carrier of a third carrier group.

The technical solution according to embodiments of the present disclosure may include the following beneficial effect: the random response message 3 has the corresponding time-frequency resources on the plurality of carriers, which is notified to the user device timely and conveniently without additional random access.

In an embodiment, the method further includes:
  monitoring whether time-frequency resources for transmitting the random response message 3 are idle on the at least one carrier of the third carrier group; and
  sending the random response message 3 on an idle time-frequency resource for the random response message 3 when the idle time-frequency resources for the random response message 3 exists.

The technical solution according to embodiments of the present disclosure may include the following beneficial effect: the plurality of carriers in this embodiment are configured for transmitting the random response message 3. As such, there is a greater probability of idle time-frequency resource for transmitting the random response message 3, which achieves the transmission of the random response message 3 better, and reduces the time delay.

In an embodiment, the method further includes:
monitoring a random response message 4 sent by the base station side on at least one carrier of a pre-configured fourth carrier group; and
receiving the random response message 4 on the carrier of the fourth carrier group, the random response message 4 including a cell radio network temporary identifier (C-RNTI).

The technical solution according to embodiments of the present disclosure may include the following beneficial effect: a plurality of carriers are configured to transmit the random response message 4 in this embodiment. As such, there is a greater probability of idle time-frequency resource for the random response message 4, which may achieve the transmission of the random response message 4 better and reduce the time delay. Therefore, the user device needs to monitor the plurality of carriers to receive the random response message 4.

According to a second aspect of embodiments of the present disclosure, a method for processing random access applied to a base station side is provided, including:
receiving a random access preamble sent by a user device through a time-frequency resource for a physical random access channel (PRACH) on a carrier of a pre-configured first carrier group, to obtain a random access request, wherein the first carrier group includes at least two carriers;
monitoring whether time-frequency resources for a random access response (RAR) message are idle on at least one carrier of a pre-configured second carrier group; and
sending the RAR in an idle time-frequency resource for the RAR when the idle time-frequency resource for the RAR exists.

In an embodiment, before receiving the random access preamble sent by the user device, the method further includes:
sending a first system information block to the user device, the first system information block including indication information of the first carrier group and indication information of the time-frequency resources for the PRACH on at least one carrier of the first carrier group.

In an embodiment, before monitoring whether time-frequency resources for the RAR message are idle, the method further includes:
sending a second system information block to the user device, the second system information block including indication information of the second carrier group.

In an embodiment, the second system information block further includes indication information of the time-frequency resources for the RAR.

In an embodiment, the RAR includes indication information of time-frequency resources for a random response message 3 on at least one carrier of a third carrier group.

In an embodiment, the method further includes:
receiving the random response message 3 sent by the user device on the carrier in the third carrier group.

In an embodiment, the method further includes:
monitoring whether time-frequency resources for a random response message 4 are idle on at least one carrier of a pre-configured fourth carrier group; and
sending the random response message 4 on an idle time-frequency resource for the random response message 4 when the idle time-frequency resource for the random response message 4 exists, the random response message 4 including a cell radio network temporary identifier (C-RNTI).

According to a third aspect of embodiments of the present disclosure, an apparatus for processing random access applied to a user device side is provided, including:
a first monitoring module, configured to monitor whether time-frequency resources for transmitting a physical random access channel (PRACH) are idle on at least one carrier of a pre-configured first carrier group, wherein the first carrier group includes at least two carriers; and
a first sending module, configured to send a random access preamble on an idle time-frequency resource for the PRACH when the idle time-frequency resource for the PRACH exists, to request random access.

In an embodiment, the apparatus further includes:
a first receiving module, configured to receive a first system information block sent by a base station side, the first system information block including indication information of the first carrier group and indication information of the time-frequency resources for the PRACH on the at least one carrier of the first carrier group.

In an embodiment, the apparatus further includes:
a second monitoring module, configured to monitor a random access response (RAR) message sent by a base station side on at least one carrier of a pre-configured second carrier group, wherein the second carrier group includes at least two carriers;
a second receiving module, configured to receive the RAR on the carrier in the second carrier group; and
a decoding module, configured to decode the RAR with a random access radio network temporary identifier (RA-RNTI), wherein the RA-RNTI is determined based on the idle time-frequency resource for the PRACH and the carrier where the idle time-frequency resource for the PRACH is located.

In an embodiment, the apparatus further includes:
a third receiving module, configured to receive a second system information block sent by the base station side, the second system information block including indication information of the second carrier group.

In an embodiment, the second system information block further includes indication information of time-frequency resources for the RAR.

In an embodiment, the RAR includes indication information of time-frequency resources for a random response message 3 on at least one carrier of a third carrier group.

In an embodiment, the apparatus further includes:
a third monitoring module, configured to monitor whether time-frequency resources for transmitting the random response message 3 are idle on the at least one carrier of the third carrier group; and
a second sending module, configured to send the random response message 3 on an idle time-frequency resource for the random response message 3 when the idle time-frequency resource for the random response message 3 exists.

In an embodiment, the apparatus further includes:
a fourth monitoring module, configured to monitor a random response message 4 sent by the base station side on at least one carrier of a pre-configured fourth carrier group; and
a fourth receiving module, configured to receive the random response message 4 on the carrier in the fourth carrier group, the random response message 4 including a cell radio network temporary identifier (C-RNTI).

According to a fourth aspect of embodiments of the present disclosure, an apparatus for processing random access applied to a base station side is provided, including:
a first receiving module, configured to receive a random access preamble sent by a user device through a time-frequency resource for a physical random access channel (PRACH) on a carrier in a pre-configured first carrier group, to obtain a random access request, wherein the first carrier group includes at least two carriers;
a first monitoring module, configured to monitor whether time-frequency resources for a random access response (RAR) message are idle on at least one carrier of a pre-configured second carrier group; and
a first sending module, configured to send the RAR on an idle time-frequency resource for the RAR when the idle time-frequency resource for the RAR exists.

In an embodiment, the apparatus further includes:
a second sending module, configured to send a first system information block to the user device, the first system information block including indication information of the first carrier group and indication information of the time-frequency resources for the PRACH on at least one carrier of the first carrier group.

In an embodiment, the apparatus further includes:
a third sending module, configured to send a second system information block to the user device, the second system information block including indication information of the second carrier group.

In an embodiment, the second system information block further includes indication information of the time-frequency resources for the RAR.

In an embodiment, the RAR includes indication information of the time-frequency resources for a random response message 3 on at least one carrier of a third carrier group.

In an embodiment, the apparatus further includes:
a second receiving module, configured to receive the random response message 3 sent from the user device on the carrier in the third carrier group.

In an embodiment, the apparatus further includes:
a second monitoring module, configured to monitor whether time-frequency resources for a random response message 4 are idle on at least one carrier of a pre-configured fourth carrier group; and
a fourth sending module, configured to send the random response message 4 on an idle time-frequency resource for the random response message 4 when the idle time-frequency resource for the random response message 4 exists, the random response message 4 including a cell radio network temporary identifier (C-RNTI).

According to a fifth aspect of embodiments of the present disclosure, a device for processing random access is provided, including:
a processor; and
a memory configured to store instructions executable by the processor;
wherein the processor is configured to:
monitor whether time-frequency resources for transmitting a physical random access channel (PRACH) are idle on at least one carrier of a pre-configured first carrier group, wherein the first carrier group includes at least two carriers; and
send a random access preamble on the idle time-frequency resource for the PRACH when the idle time-frequency resource for the PRACH existing, to request random access.

According to a sixth aspect of embodiments of the present disclosure, a device for processing random access is provided, including:
a processor; and
a memory configured to store instructions executable by the processor;
wherein the processor is configured to:
receive a random access preamble sent from a user device through a time-frequency resource for a physical random access channel (PRACH) on a carrier in a pre-configured first carrier group, to obtain a random access request, wherein the first carrier group includes at least two carriers;
monitor whether time-frequency resources for a random access response (RAR) message are idle on at least one carrier of a pre-configured second carrier group; and
send the RAR on an idle time-frequency resource for the RAR when the idle time-frequency resource for the RAR exists.

According to a seventh aspect of embodiments of the present disclosure, a computer-readable storage medium having computer instructions stored thereon is provided. When the instructions are executed by a processor, the method at the user device side is implemented.

According to an eighth aspect of embodiments of the present disclosure, a computer-readable storage medium having computer instructions stored thereon is provided. When the instructions are executed by a processor, the method at the base station side is implemented.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

In the related art, the industry has recently conducted a project study on 5G (5th generation mobile communications) unlicensed spectrum and has proposed a solution to support individual networking of a 5G unlicensed cell. It is necessary to follow an LBT (Listen Before Talk) mechanism on an individual networking design of 5G unlicensed spectrum. That is, channels need to be monitored before sending a message regardless of uplink and downlink in the random access process. If there are no available time-frequency resources, the time delay will be increased and the efficiency of random access will be affected.

In order to solve the above problem, in this embodiment, time-frequency resources on a plurality of carriers are configured for random access uplink and downlink transmission. The transmission may be completed once the time-frequency resources on at least one carrier is idle, which improves the transmission probability and reduces time delay, and facilitates improving the efficiency of random access.

Figure 1:
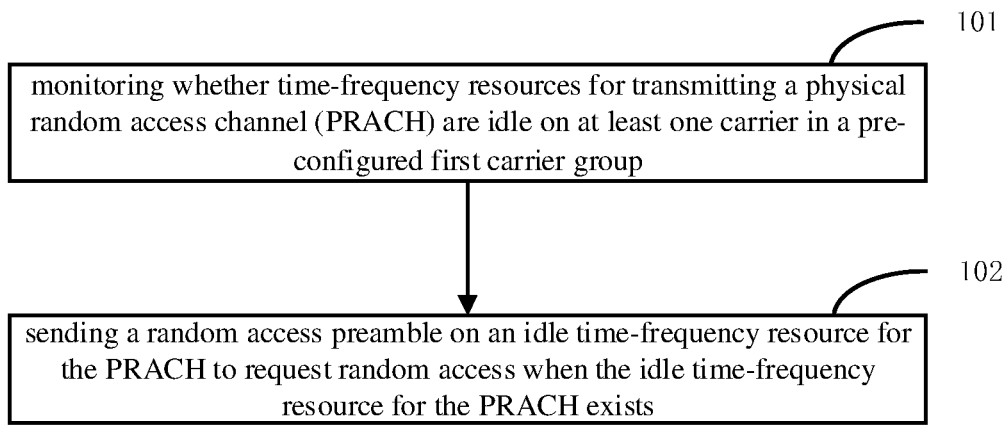
FIG. 1 is a flowchart illustrating a method for processing random access according to an example embodiment.

FIG. 1 is a flow chart illustrating a method for processing random access according to an example embodiment. The method for processing random access is applied to a terminal. The terminal may be a mobile phone, a computer, a digital broadcasting terminal, a messaging device, a game console, a tablet device, a medical device, a fitness equipment, a personal digital assistant, etc.

As illustrated in FIG. 1, the method includes the following steps 101-102.

At step 101, it is monitored whether time-frequency resources for transmitting a physical random access channel (PRACH) are idle on at least one carrier of the pre-configured first carrier group, in which the first carrier group includes at least two carriers.

At step 102, when an idle time-frequency resource for the PRACH exists, a random access preamble is sent on the idle time-frequency resource for the PRACH, to request random access.

In a case that there is no idle time-frequency resource for the PRACH, the transmission of the random access preamble is dropped at this time, and step 101 may be continued.

In this embodiment, time-frequency resources for the PRACH are configured on a plurality of carriers. The user device may monitor some carriers of the first carrier group, such as at least one carrier, and may randomly select some carriers from the first carrier group to monitor. With this selection mechanism, the probability of detecting the idle time-frequency resource may be increased, which facilitates improving the efficiency of random access.

Or, the user device may monitor all the carriers in the first carrier group. The transmission of the preamble may be completed once the time-frequency resource on at least one carrier is idle, thereby achieving the random access request. The probability of transmitting the preamble is increased, the time delay is reduced, and the efficiency of random access is improved.

The user device may simultaneously monitor whether the time-frequency resources for the PRACH on a plurality of carriers are idle. In a case that there are idle time-frequency resources for the PRACH on the plurality of carriers, the time-frequency resource for the PRACH on one carrier is selected in a first preset order for transmitting the preamble.

Or, based on a second preset order, it is first monitored whether the time-frequency resource for the PRACH on a first carrier of the first carrier group is idle, and if yes, the time-frequency resource for the PRACH on the first carrier is used to transmit the preamble, and other carriers of the first carrier group are not monitored. If the time-frequency resource for the PRACH on the first carrier is not idle, a second carrier of the first carrier group in the second preset order is monitored, and so on.

The first order may be the same as or different from the second order. The order may be from high to low or from low to high according to the frequency band. Various orders may be applied to this embodiment.

This embodiment not only follows the LBT principle, but also improves the efficiency of the random access request and reduces the time delay.

In an embodiment, before monitoring whether the time-frequency resources for transmitting the PRACH are idle, the method further includes step A.

At step A, a first system information block sent by a base station side is received, in which the first system information block includes indication information of the first carrier group and indication information of the time-frequency resource for the PRACH on the at least one carrier of the first carrier group.

In this embodiment, the base station sends the first system information block to the user device in advance, so as to configure the time-frequency resources for the PRACH on a plurality of carriers. The first system information block may be a master information block (MIB), a system information block (SIB) 2 or other system information block. The base station may send the first system information block when the user device is in an idle or inactive state or when random access is required.

In an embodiment, the method further includes: step B1-step B3.

At step B1, a random access response (RAR) message sent by the base station side is monitored on at least one carrier of a pre-configured second carrier group, in which the second carrier group includes at least two carriers.

At step B2, the RAR is received on carrier of the second carrier group.

At step B3, the RAR is decoded with a random access radio network temporary identifier (RA-RNTI), in which the RA-RNTI is determined based on the idle time-frequency resource for the PRACH and the carrier where the idle time-frequency resource for the PRACH is located.

In this embodiment, time-frequency resources for RAR are configured on the plurality of carriers, thereby increasing the probability of transmitting the RAR. Therefore, the user device needs to monitor the RAR on the plurality of carriers, in order to receive the RAR.

In addition, the RA-RNTI in this embodiment is determined based on idle time-frequency resource for PRACH and the carrier where the idle time-frequency resources for the PRACH (time-frequency resource for transmitting the preamble) is located. As such, there may be more RA-RNTIs to enable more user devices to perform random access at the same time, reducing conflicts, and improving the success rate of random access. The base station also encodes the RAR according to the RA-RNTI.

In an embodiment, before monitoring the RAR message sent by the base station side, the method further includes step C.

At step C, a second system information block sent by the base station side is received, in which the second system information block includes indication information of the second carrier group.

In this embodiment, the base station sends the second system information block to the user device in advance, so as to configure time-frequency resources for the RAR on a plurality of carriers. The second system information block may be an MIB, a SIB 2 or other system information blocks. The base station may send the second system information block when the user device is in an idle or inactive state or when random access is required.

The second system information block and the first system information block may be the same system information block or different system information blocks.

In this embodiment, the second system information block may not include indication information of the time-frequency resources for the RAR, and the user device may monitor the second carrier group.

In an embodiment, the second system information block further includes indication information of the time-frequency resources for the RAR.

In this embodiment, the second system information block further includes the indication information of the time-frequency resources for the RAR. As such, the user device may monitor the RAR more accurately.

In an embodiment, the RAR includes indication information of the time-frequency resources for a random response message (Msg) 3 on at least one carrier of the third carrier group.

In this embodiment, the RAR is used to notify the user device of the indication information of the time-frequency resources for Msg3 without additional notification message, so that the user device may know the time-frequency resources for Msg3 in time.

In addition, the third carrier group includes at least two carriers which may be the same as or different from the first carrier group. If the third carrier group is the same as the first carrier group, the RAR may not include the third carrier group.

In an embodiment, the method further includes step D1-step D2.

At step D1, it is monitored whether time-frequency resources for transmitting the random response message 3 are idle on the at least one carrier of the third carrier group.

At step D2, the random response message 3 is sent in an idle time-frequency resource for the random response message 3 when the idle time-frequency resource for the random response message 3 exists.

In a case that there is no idle time-frequency resource for the random response message 3, the transmission of the random response message 3 is dropped at this time and step D1 or 101 may be continued.

The monitoring process of step D1 in this embodiment may refer to the monitoring process of step 101, i.e., part or all of the carriers in the third carrier group may be monitored. A plurality of carriers may be monitored at the same time, or respective carriers may be monitored in a preset order.

The random response message 3 may include a temporary cell radio network temporary identifier (TC-RNTI).

In this embodiment, the random response message 3 is configured with time-frequency resources on the plurality of carriers. The transmission of the random response message 3 may be completed once the time-frequency resources on at least one carrier are idle, which improves the probability of transmitting the random response message 3, reduces the time delay, and facilitates improving the efficiency of random access.

In an embodiment, the method further includes step E1-step E2.

At step E1, a random response message 4 sent by the base station side is monitored on at least one carrier of a pre-configured fourth carrier group.

At step E2, the random response message 4 is received on the carrier of the fourth carrier group, in which the random response message 4 includes a cell radio network temporary identifier (C-RNTI).

In this embodiment, the random response message 4 is configured with time-frequency resources on the plurality of carriers, thereby increasing the probability of sending the RAR. Therefore, the user device needs to monitor the random response message 4 on the plurality of carriers, in order to receive the random response message 4.

The fourth carrier group includes at least two carriers, which may be exactly the same carriers or different carriers from the second carrier group.

In this embodiment, the base station sends the third system information block to the user device in advance, to configure the time-frequency resources for the random response message 4 on the plurality of carriers. The third system information block may be an MIB, a SIB 2 or other system information blocks. The base station may send the third system information block when the user device is in an idle or inactive state or when random access is required.

The third system information block may be the same as or different from the first and second system information blocks.

Or, the RAR includes indication information of time-frequency resources for the random response message 4 on a plurality of carriers.

If the fourth carrier group and the second carrier group include exactly the same carriers, then the RAR may not include the fourth carrier group, or there is no need to send the third system information block.

Hereafter the implementations are described in detail through several embodiments.

Figure 2:
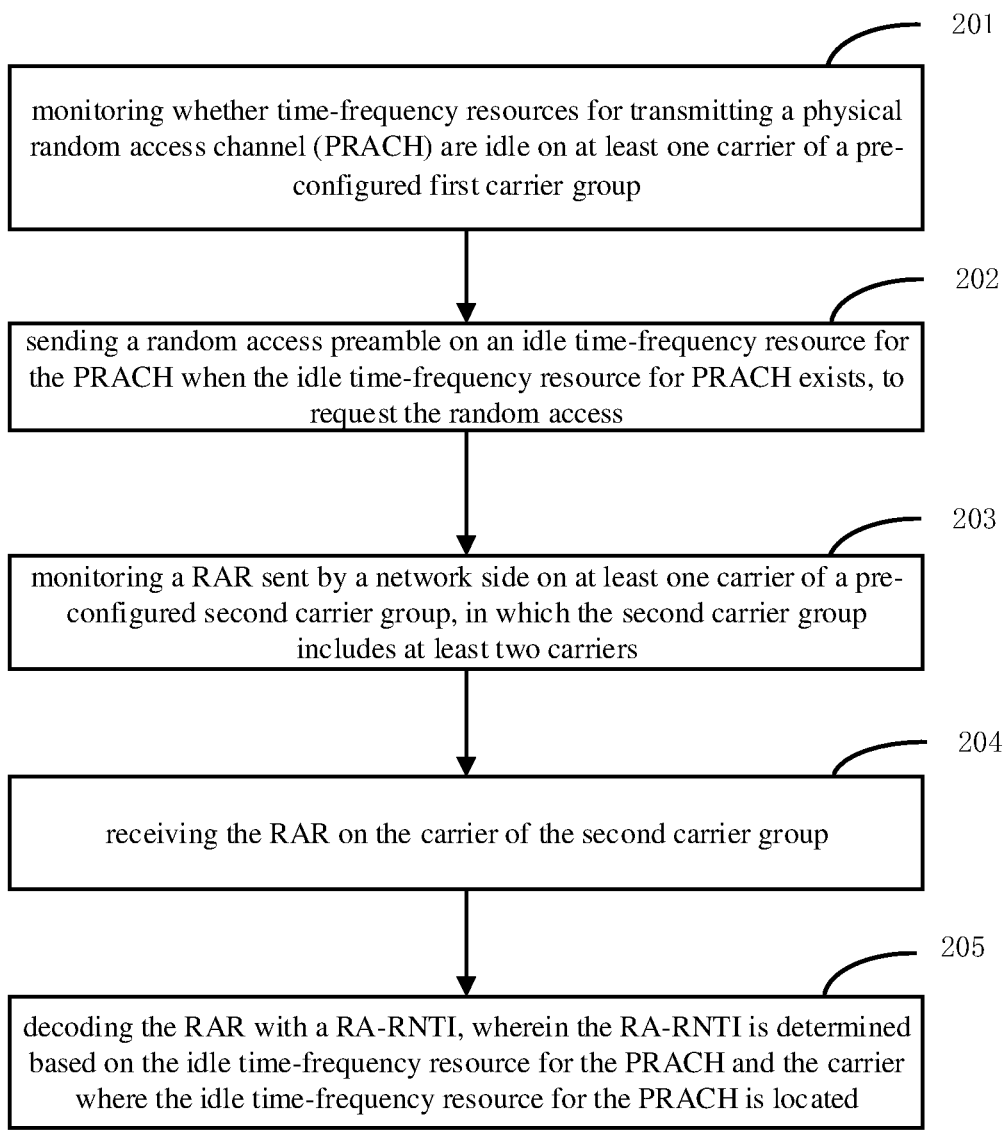
FIG. 2 is a flowchart illustrating a method for processing random access according to an example embodiment.

FIG. 2 is a flow chart illustrating a method for processing random access according to an example embodiment. The method for processing random access is applied to a terminal which may be a mobile phone, a computer, a digital broadcasting terminal, a messaging device, a game console, a tablet device, a medical device, a fitness equipment, a personal digital assistant, etc. As illustrated in FIG. 2, the method includes the following steps 201-205.

At step 201, it is monitored whether time-frequency resources for transmitting the PRACH are idle on at least one carrier of the pre-configured first carrier group, in which the first carrier group includes at least two carriers.

At step 202, when an idle time-frequency resource for the PRACH exists, a random access preamble is sent on the idle time-frequency resource for the PRACH, to request the random access.

In a case that there is no idle time-frequency resource for the PRACH, the transmission of the random access preamble is dropped at this time, and step 201 may be continued.

At step 203, a RAR message sent by a base station side is monitored on at least one carrier of a pre-configured second carrier group, in which the second carrier group includes at least two carriers.

At step 204, the RAR is received on the carrier of the second carrier group.

At step 205, the RAR is decoded with a RA-RNTI, wherein the RA-RNTI is determined based on the idle time-frequency resource for the PRACH and the carrier where the idle time-frequency resource for the PRACH is located. The RA-RNTI may be configured by the base station for the user device based on the idle time-frequency resource for the PRACH and the carrier where the idle time-frequency resource for the PRACH is located.

This embodiment is suitable for a non-contention-based random access process in a stand-alone scenario, which complies with the LBT principle and is suitable for 5G unlicensed frequency band scenarios.

Figure 3:
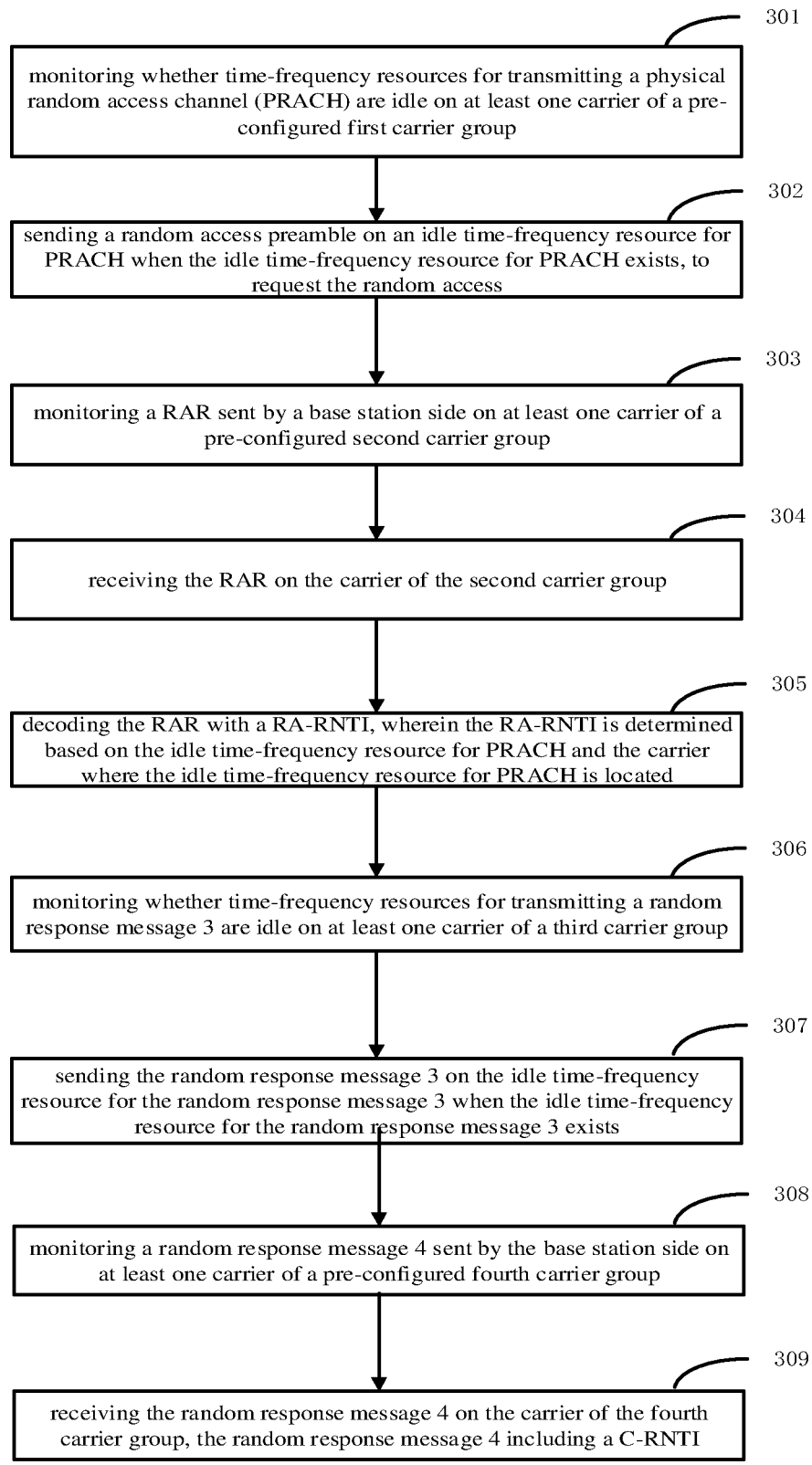
FIG. 3 is a flowchart illustrating a method for processing random access according to an example embodiment.

FIG. 3 is a flow chart illustrating a method for processing random access according to an example embodiment. The method for processing random access is applied to a terminal which may be a mobile phone, a computer, a digital broadcasting terminal, a messaging device, a game console, a tablet device, a medical device, a fitness equipment, a personal digital assistant, etc. As illustrated in FIG. 3, the method includes the following steps 301-309.

At step 301, it is monitored whether time-frequency resources for transmitting PRACH are idle on at least one carrier of the pre-configured first carrier group, in which the first carrier group includes at least two carriers.

At step 302, when the idle time-frequency resource for the PRACH exists, a random access preamble is sent on the idle time-frequency resource for the PRACH, to request the random access.

In case that there is no idle time-frequency resource for the PRACH, the transmission of the random access preamble is dropped at this time, and step 301 may be continued.

At step 303, a RAR message sent by a base station side is monitored on at least one carrier of a pre-configured second carrier group, in which the second carrier group includes at least two carriers.

At step 304, the RAR is received on the carrier of the second carrier group.

At step 305, the RAR is decoded with a RA-RNTI, wherein the RA-RNTI is determined based on the idle time-frequency resource for the PRACH and the carrier where the idle time-frequency resource for the PRACH is located. The RA-RNTI may be determined by the user device itself based on the idle time-frequency resource for the PRACH and the carrier where the idle time-frequency resource for the PRACH is located.

At step 306, it is monitored whether time-frequency resources for transmitting a random response message 3 are idle on at least one carrier of a third carrier group.

At step 307, the random response message 3 is sent on an idle time-frequency resource for the random response message 3 when the idle time-frequency resource for the random response message 3 exists.

In case that there is no idle time-frequency resource for the random response message 3, the transmission of the random response message 3 is dropped at this time and step D1 or 301 may be continued.

At step 308, a random response message 4 sent by the base station side is monitored on at least one carrier of a pre-configured fourth carrier group.

At step 309, the random response message 4 is received on the carrier of the fourth carrier group, in which the random response message 4 includes a C-RNTI.

This embodiment is suitable for a contention-based random access process in a stand-alone scenario, which complies with the LBT principle and is suitable for 5G unlicensed frequency band scenarios.

The above is the implementation process at the user device side. Correspondingly, the base station side has also been improved. The implementation process at the base station side is introduced below.

Figure 4:
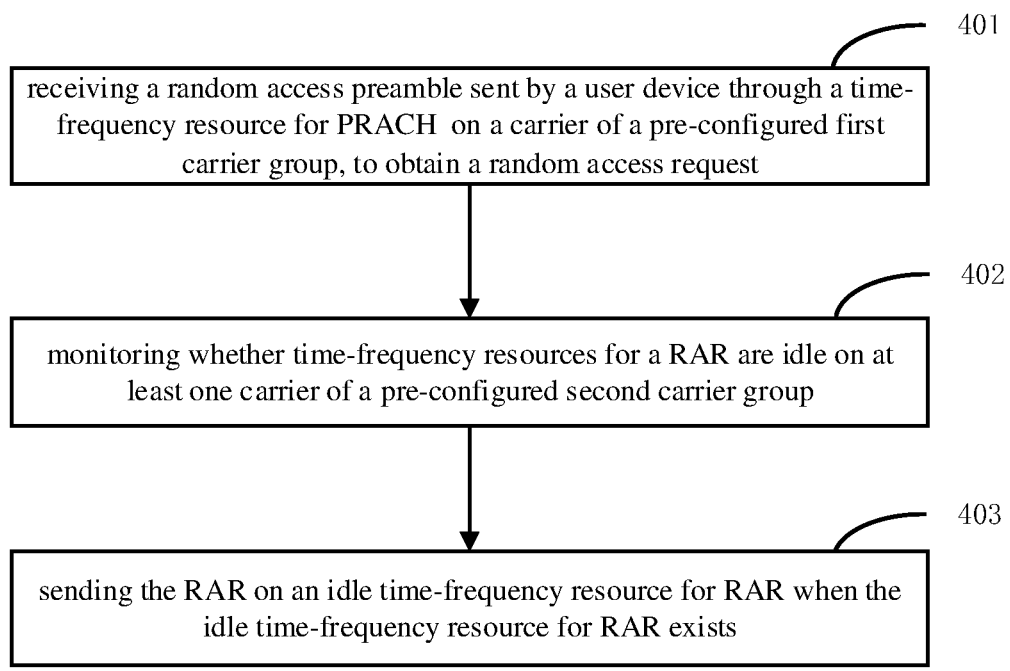
FIG. 4 is a flowchart illustrating a method for processing random access according to an example embodiment.

FIG. 4 is a flow chart illustrating a method for processing random access according to an example embodiment. The method for processing random access is applied to access devices such as base stations. As illustrated in FIG. 4, the method includes the following steps 401-403.

At step 401, a random access preamble sent by a user device through a time-frequency resource for a PRACH is received on a carrier of a pre-configured first carrier group, to obtain a random access request, wherein the first carrier group includes at least two carriers.

At step 402, it is monitored whether time-frequency resources for RAR are idle on at least one carrier of the pre-configured second carrier group.

At step 403, the RAR is sent on an idle time-frequency resource for the RAR when the idle time-frequency resource for the RAR exists.

In case that there is no idle time-frequency resource for the RAR, the transmission of the RAR is dropped at this time, and step 402 or 401 may be continued.

In this embodiment, the base station monitors a plurality of carriers in order to receive the random access preamble sent from the user device.

The RAR is configured by the base station with time-frequency resources on the plurality of carriers. The base station may monitor some carriers in the second carrier group, such as at least one carrier, and may randomly select some carriers from the second carrier group to monitor. With this selection mechanism, the probability of detecting the idle time-frequency resources may be increased, which facilitates improving the efficiency of random access.

Or, the base station may monitor all the carriers of the second carrier group. The transmission of RAR may be completed once the time-frequency resources on at least one carrier are idle, which improves the probability of transmitting the RAR, reduces time delay, and facilitates improving the efficiency of random access.

The base station may simultaneously monitor whether the time-frequency resources for RAR on the plurality of carriers are idle. In case that there are idle time-frequency resources for RAR on the plurality of carriers, the time-frequency resource for RAR on one carrier is selected in a third preset order to transmit the RAR.

Or, based on a preset fourth order, it is first monitored whether the time-frequency resource for the RAR on a first carrier of the second carrier group is idle, and if yes, the time-frequency resource for the RAR on the first carrier is used to transmit the RAR, and other carriers of the second carrier group are not monitored. A second carrier of the second carrier group is monitored in the fourth preset order if the time-frequency resource for the RAR on the first carrier is not idle, and so on.

The third order may be the same as or different from the fourth order. The order may be from high to low or from low to high according to the frequency band. Various orders may be applied to this embodiment.

This embodiment not only follows the LBT principle, but also improves the efficiency of the random access request and reduces the time delay.

In an embodiment, before receiving the random access preamble sent from the user device, the method further includes step G.

At step G, a first system information block is sent to the user device, in which the first system information block includes indication information of the first carrier group and indication information of the time-frequency resources for the PRACH on the at least one carrier of the first carrier group.

In this embodiment, the base station sends the first system information block to the user device in advance, so as to configure the time-frequency resources for the PRACH on a plurality of carriers. The first system information block may be an MIB, a SIB 2 or other system information blocks. The base station may send the first system information block when the user device is in an idle or inactive state or when random access is required.

In an embodiment, before monitoring whether the time-frequency resources for the random access response message (RAR) are idle, the method further includes step H.

At step H, a second system information block is sent to the user device, in which the second system information block includes indication information of the second carrier group.

In this embodiment, the base station sends the second system information block to the user device in advance, so as to configure the time-frequency resources for the RAR on the plurality of carriers. The second system information block may be an MIB, a SIB 2 or other system information blocks. The base station may send the second system information block when the user device is in an idle or inactive state or when random access is required.

The second system information block and the first system information block may be the same system information block or different system information blocks.

In this embodiment, the second system information block may not include indication information of time-frequency resources for the RAR, and the user device may monitor the second carrier group.

In an embodiment, the second system information block further includes indication information of time-frequency resources for the RAR.

In this embodiment, the second system information block further includes the indication information of time-frequency resources for the RAR. As such, the user device may monitor the RAR more accurately.

In an embodiment, the RAR includes indication information of time-frequency resources for a random response message 3 on at least one carrier of the third carrier group.

In this embodiment, RAR is used to notify the user device of the indication information of time-frequency resources for Msg3 without additional notification message, so that the user device may know the time-frequency resources for Msg3 in time.

In addition, the third carrier group includes at least two carriers which may be the same as or different from the first carrier group. If the third carrier group is the same as the first carrier group, the RAR may not include the third carrier group.

In an embodiment, the method further includes step I.

At step I, a random response message 3 sent by the user device is received on the carrier of the third carrier group.

The random response message 3 may include a temporary cell radio network temporary identifier (TC-RNTI).

In this embodiment, the random response message 3 is configured with time-frequency resources on the plurality of carriers. The transmission of random response message 3 may be completed once the time-frequency resources on at least one carrier are idle, which improves the probability of transmitting the random response message 3, reduces time delay, and facilitates improving the efficiency of random access.

In an embodiment, the method further includes step J1-step J2.

At step J1, it is monitored whether time-frequency resources for a random response message 4 are idle on at least one carrier of a pre-configured fourth carrier group.

At step J2, the random response message 4 is sent on an idle time-frequency resource for the random response message 4 when the idle time-frequency resource for the random response message 4 exists, in which the random response message 4 includes a cell radio network temporary identifier (C-RNTI).

In case that there is no idle time-frequency resource for the random response message 4, the transmission of random response message 4 is dropped this time, and step J1 or 401 may be continued.

The monitoring process of step J1 in this embodiment may refer to the monitoring process of step 402, i.e., part or all of the carriers in the fourth carrier group may be monitored. A plurality of carriers may be monitored at the same time, or respective carriers may be monitored in a preset order.

In this embodiment, the random response message 4 is configured with time-frequency resources on the plurality of carriers, thereby increasing the probability of transmitting the RAR. Therefore, the user device needs to monitor the random response message 4 on the plurality of carriers in order to receive the random response message 4.

The fourth carrier group includes at least two carriers, which may be exactly the same carriers or different carriers from the second carrier group.

In this embodiment, the base station sends the third system information block to the user device in advance to configure the time-frequency resources for the random response message 4 on the plurality of carriers. The third system information block may be an MIB, a SIB 2 or other system information blocks. The base station may send the third system information block when the user device is in an idle or inactive state or when random access is required.

The third system information block may be the same as or different from the first and second system information blocks.

Or, the RAR includes indication information of time-frequency resources for the random response message 4 on a plurality of carriers.

If the fourth carrier group and the second carrier group include exactly the same carriers, then the RAR may not include the fourth carrier group, or there is no need to send the third system information block.

Hereafter the implementations are described in detail through several embodiments.

Figure 5:
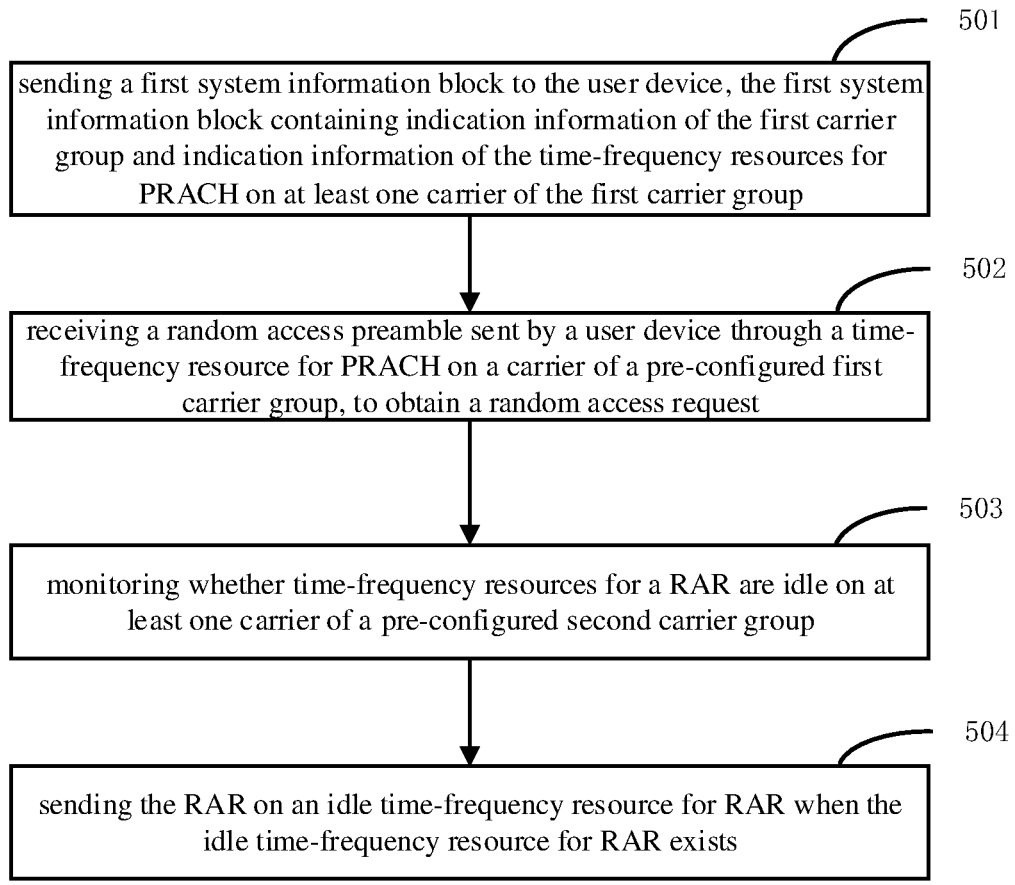
FIG. 5 is a flowchart illustrating a method for processing random access according to an example embodiment.

FIG. 5 is a flowchart illustrating a method for processing random access according to an example embodiment. The method for processing random access is applied to access devices such as base stations. As illustrated in FIG. 5, the method includes the following steps 501-504.

At step 501, a first system information block is sent to a user device, in which the first system information block includes indication information of a first carrier group and indication information of time-frequency resources for PRACH on at least one carrier of the first carrier group. At step 502, a random access preamble sent by a user device through a time-frequency resource for the PRACH is received on a carrier of a pre-configured first carrier group, to obtain a random access request, wherein the first carrier group includes at least two carriers.

At step 503, it is monitored whether time-frequency resources for RAR are idle on at least one carrier of the pre-configured second carrier group.

At step 504, the RAR is sent on an idle time-frequency resource for the RAR when the idle time-frequency resource for the RAR exists.

This embodiment is suitable for a non-contention-based random access process in a stand-alone scenario, which complies with the LBT principle and is suitable for 5G unlicensed frequency band scenarios. In this embodiment, step 501 is executed when it is determined that a user device needs to perform random access, which is applicable to a scenario where a base station initiates a cell handover.

Figure 6:
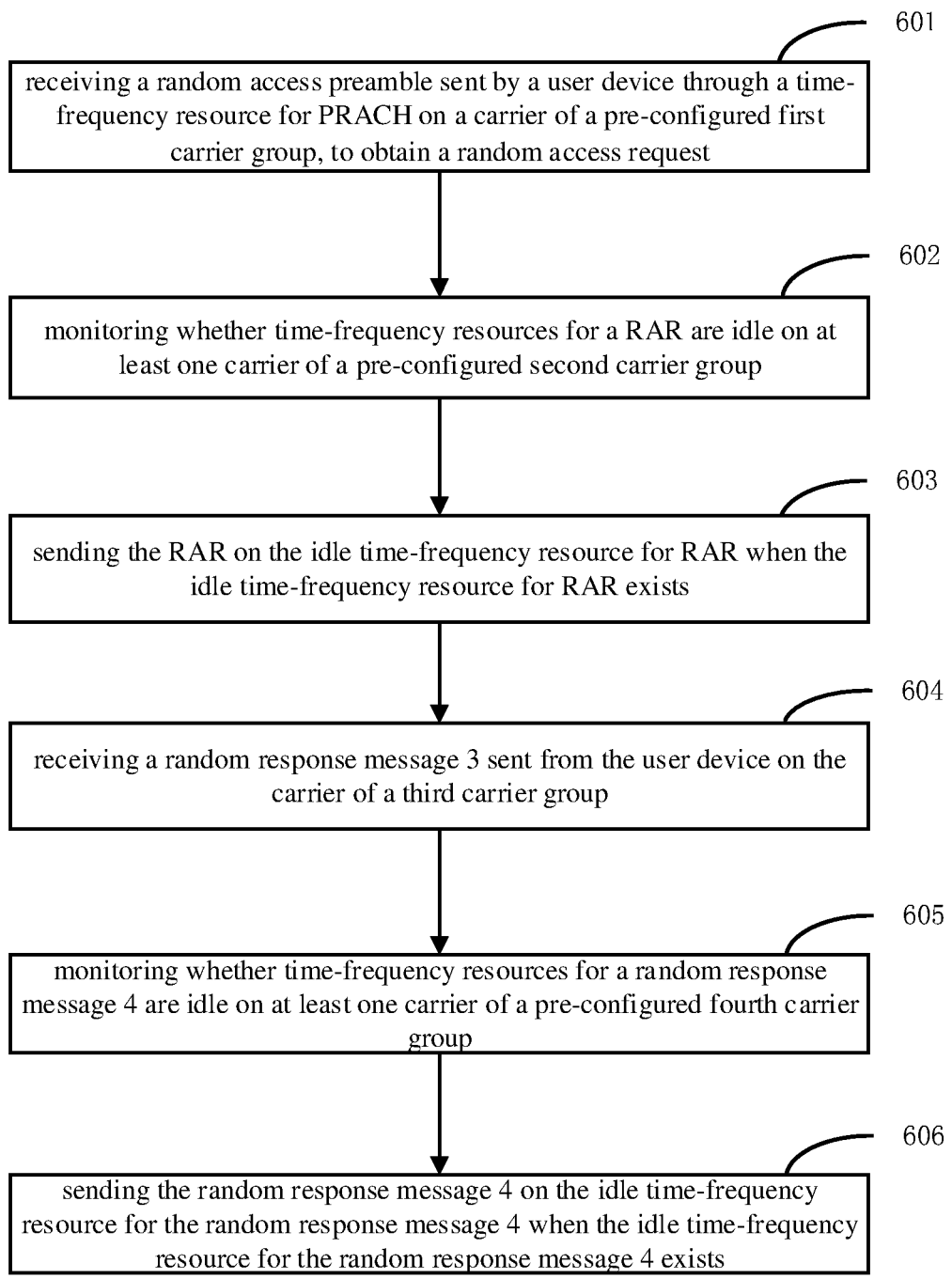
FIG. 6 is a flowchart illustrating a method for processing random access according to an example embodiment.

FIG. 6 is a flowchart illustrating a method for processing random access according to an example embodiment. The method for processing random access is applied to access devices such as base stations. As illustrated in FIG. 6, the method includes the following steps 601-606.

At step 601, a random access preamble sent by a user device through a time-frequency resource for PRACH is received on a carrier of a pre-configured first carrier group, to obtain a random access request, wherein the first carrier group includes at least two carriers.

At step 602, it is monitored whether time-frequency resources for RAR are idle on at least one carrier of the pre-configured second carrier group.

At step 603, the RAR is sent on an idle time-frequency resource for RAR when the idle time-frequency resources of RAR exists. The RAR includes indication information of time-frequency resources for a random response message 3 on at least one carrier of the third carrier group.

At step 604, a random response message 3 sent by the user device is received on the carrier of the third carrier group.

At step 605, it is monitored whether time-frequency resources for a random response message 4 are idle on at least one carrier of a pre-configured fourth carrier group.

At step 606, the random response message 4 is sent on an idle time-frequency resource for the random response message 4 when the idle time-frequency resource for the random response message 4 exists, in which the random response message 4 includes a C-RNTI.

This embodiment is suitable for a contention-based random access process in a stand-alone scenario, which complies with the LBT principle and is suitable for 5G unlicensed frequency band scenarios.

Hereafter, the implementation process is described in combination with a user device and a base station.

Figure 7:
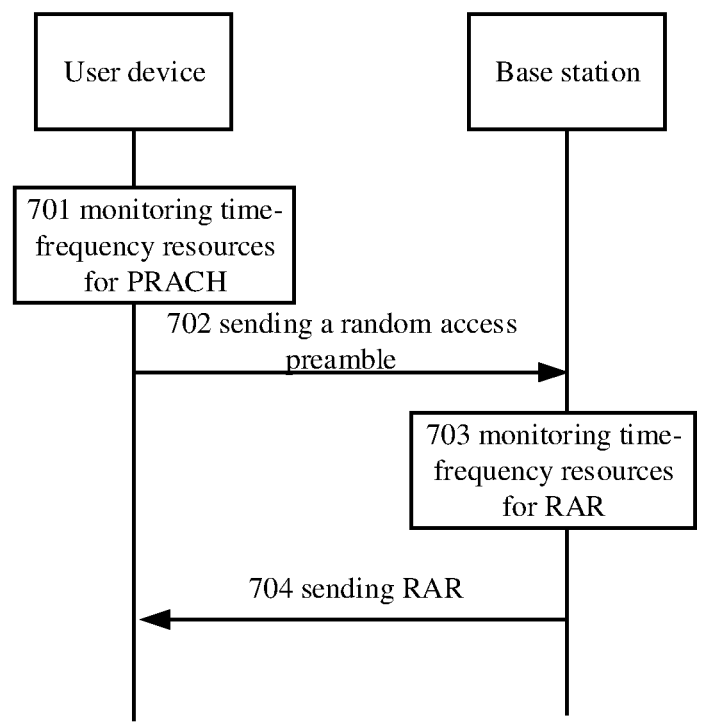
FIG. 7 is a flowchart illustrating a method for processing random access according to an example embodiment.

FIG. 7 is a flowchart illustrating a method for processing random access according to an example embodiment. As illustrated in FIG. 7, the method includes the following steps 701-704.

At step 701, the user device monitors whether time-frequency resources for transmitting a PRACH are idle on at least one carrier of a pre-configured first carrier group, in which the first carrier group includes at least two carriers.

At step 702, the user device sends a random access preamble on an idle time-frequency resource for the PRACH when the idle time-frequency resources of PRACH exists, to request the random access.

In case that there is no idle time-frequency resource for the PRACH, the transmission of the random access preamble is dropped at this time, and step 701 may be continued.

At step 703, the base station monitors whether time-frequency resources for RAR are idle on at least one carrier of a pre-configured second carrier group.

In case that there are no idle time-frequency resources for the RAR, the transmission of RAR is dropped at this time, and step 701 or 703 may be continued.

At step 704, the base station sends the RAR in an idle time-frequency resource for the RAR when the idle time-frequency resource for the RAR exists.

This embodiment is suitable for a non-contention-based random access process in a stand-alone scenario, which complies with the LBT principle and is suitable for 5G unlicensed frequency band scenarios.

Figure 8:
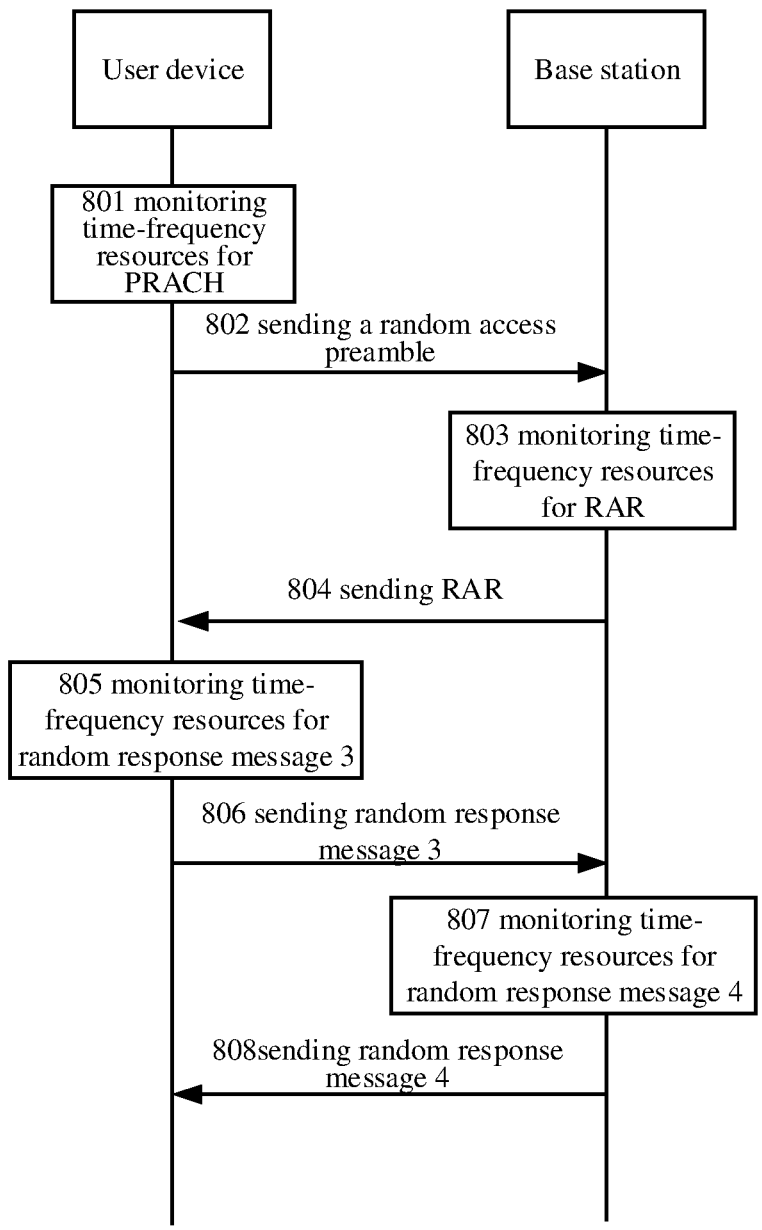
FIG. 8 is a flow chart illustrating a method for processing random access according to an example embodiment.

FIG. 8 is a flowchart illustrating a method for processing random access according to an example embodiment. As illustrated in FIG. 8, the method includes the following steps 801-804.

At step 801, the user device monitors whether time-frequency resources for transmitting a PRACH are idle on at least one carrier of a pre-configured first carrier group, in which the first carrier group includes at least two carriers.

At step 802, when idle time-frequency resources for the PRACH exist, the user device sends a random access preamble in the idle time-frequency resource for the PRACH, to request the random access.

In case that there are no idle time-frequency resources for the PRACH, the transmission of the random access preamble is dropped at this time, and step 801 may be continued.

At step 803, the base station monitors whether time-frequency resources for RAR are idle on at least one carrier of a pre-configured second carrier group.

In case that there are no idle time-frequency resources for RAR, the transmission of RAR is dropped at this time and step 801 or 803 may be continued.

At step 804, when idle time-frequency resources of RAR exist, the base station sends the RAR in the idle time-frequency resource for RAR. The RAR includes indication information of time-frequency resources for the random response message 3 on at least one carrier of the third carrier group.

At step 805, the user device monitors whether time-frequency resources for transmitting the random response message 3 are idle on at least one carrier of a pre-configured third carrier group.

In case that there are no idle time-frequency resources for the random response message 3, the transmission of random response message 3 is dropped at this time and step 801 or step 805 may be continued.

At step 806, when idle time-frequency resources for the random response message 3 exist, the user device sends the random response message 3 on the idle time-frequency resource for the random response message 3.

At step 807, the base station monitors whether time-frequency resources for a random response message 4 are idle on at least one carrier of a pre-configured fourth carrier group.

In case that there are no idle time-frequency resources for the random response message 4, the transmission of random response message 4 is dropped at this time and step 801 or 807 may be continued.

At step 808, when idle time-frequency resources for the random response message 4 exist, the base station sends the random response message 4 on the idle time-frequency resource for the random response message 4. The random response message 4 includes a C-RNTI.

This embodiment is suitable for a contention-based random access process in a stand-alone scenario, which complies with the LBT principle and is suitable for 5G unlicensed frequency band scenarios.

The above embodiments may be freely combined according to actual needs.

The following are device embodiments of the present disclosure, which may be used to implement the method embodiments of the present disclosure.

Figure 9:
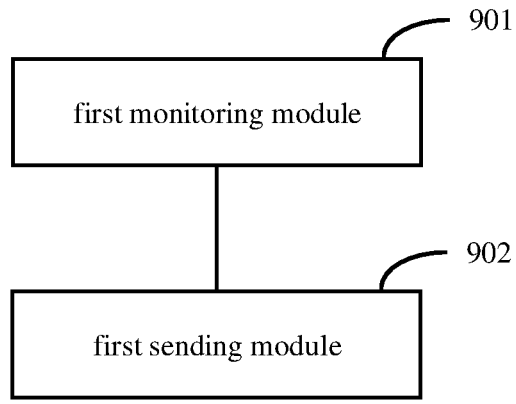
FIG. 9 is a block diagram illustrating an apparatus for processing random access according to an example embodiment.

FIG. 9 is a block diagram illustrating an apparatus for processing random access according to an example embodiment. The apparatus may be implemented as part or all of an electronic device in software, hardware or a combination thereof, which is applied to a user device side. Referring to FIG. 9, the apparatus for processing random access includes a first monitoring module 901 and a first sending module 902.

The first monitoring module 901 is configured to monitor whether time-frequency resources for transmitting a physical random access channel (PRACH) are idle on at least one carrier of a pre-configured first carrier group, in which the first carrier group includes at least two carriers.

The first sending module 902 is configured to send a random access preamble on an idle time-frequency resource for the PRACH when the idle time-frequency resource for the PRACH exists, to request the random access.

Figure 10:
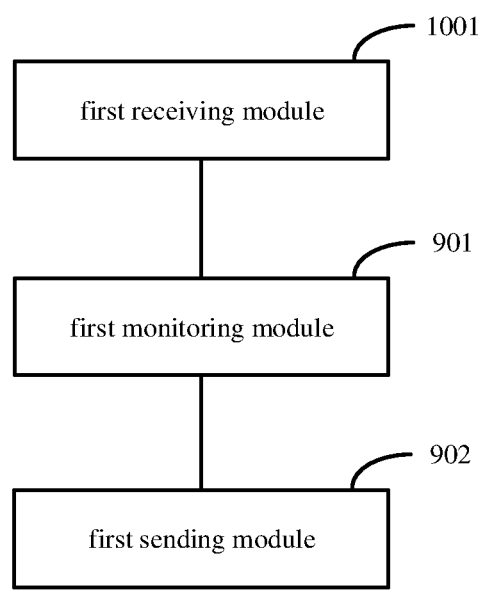
FIG. 10 is a block diagram illustrating an apparatus for processing random access according to an example embodiment.

In an embodiment, as illustrated in FIG. 10, the apparatus further includes a first receiving module 1001.

The first receiving module 1001 is configured to receive a first system information block sent from a base station side, the first system information block including indication information of the first carrier group and indication information of the time-frequency resources for the PRACH on the at least one carrier of the first carrier group.

Figure 11:
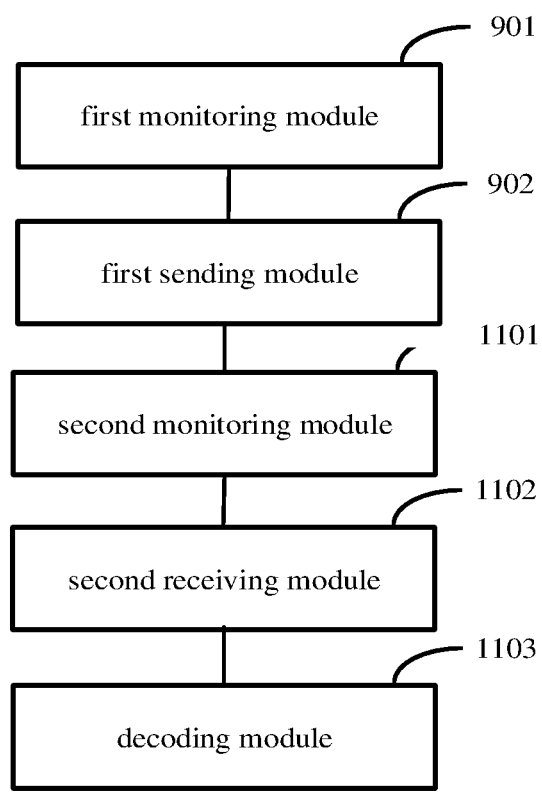
FIG. 11 is a block diagram illustrating an apparatus for processing random access according to an example embodiment.

In an embodiment, as illustrated in FIG. 11, the apparatus further includes a second monitoring module 1101, a second receiving module 1102, and a decoding module 1103.

The second monitoring module 1101 is configured to monitor a random access response (RAR) message sent by a base station side on at least one carrier of a pre-configured second carrier group, wherein the second carrier group includes at least two carriers.

The second receiving module 1102 is configured to receive RAR on the carrier in the second carrier group.

The decoding module 1103 is configured to decode the RAR with a random access radio network temporary identifier (RA-RNTI), wherein the RA-RNTI is determined based on the idle time-frequency resource for the PRACH and the carrier where the idle time-frequency resource for the PRACH is located.

Figure 12:
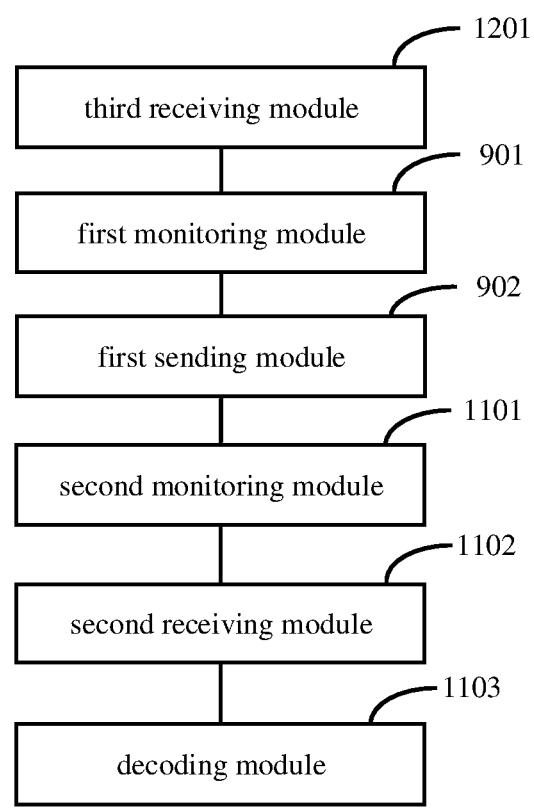
FIG. 12 is a block diagram illustrating an apparatus for processing random access according to an example embodiment.

In an embodiment, as illustrated in FIG. 12, the apparatus further includes a third receiving module 1201.

The third receiving module 1201 is configured to receive a second system information block sent from the base station side, the second system information block including indication information of the second carrier group.

In an embodiment, the second system information block further includes indication information of time-frequency resources for the RAR.

In an embodiment, the RAR includes indication information of time-frequency resources for a random response message 3 on at least one carrier of a third carrier group.

Figure 13:
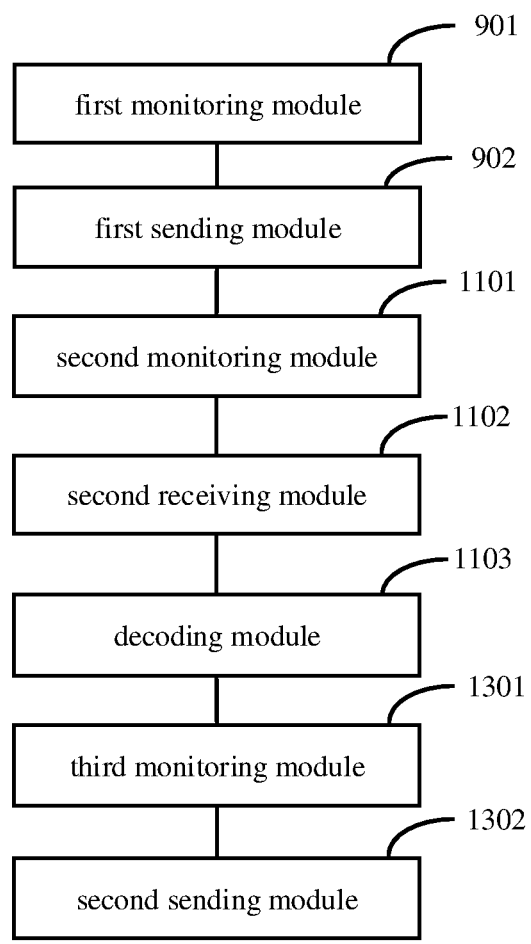
FIG. 13 is a block diagram illustrating an apparatus for processing random access according to an example embodiment.

In an embodiment, as illustrated in FIG. 13, the apparatus further includes a third monitoring module 1301 and a second sending module 1302.

The third monitoring module 1301 is configured to monitor whether time-frequency resources for transmitting the random response message 3 are idle on the at least one carrier of the third carrier group.

The second sending module 1302 is configured to send the random response message 3 on an idle time-frequency resource for the random response message 3 when the idle time-frequency resource for the random response message 3 exists.

Figure 14:
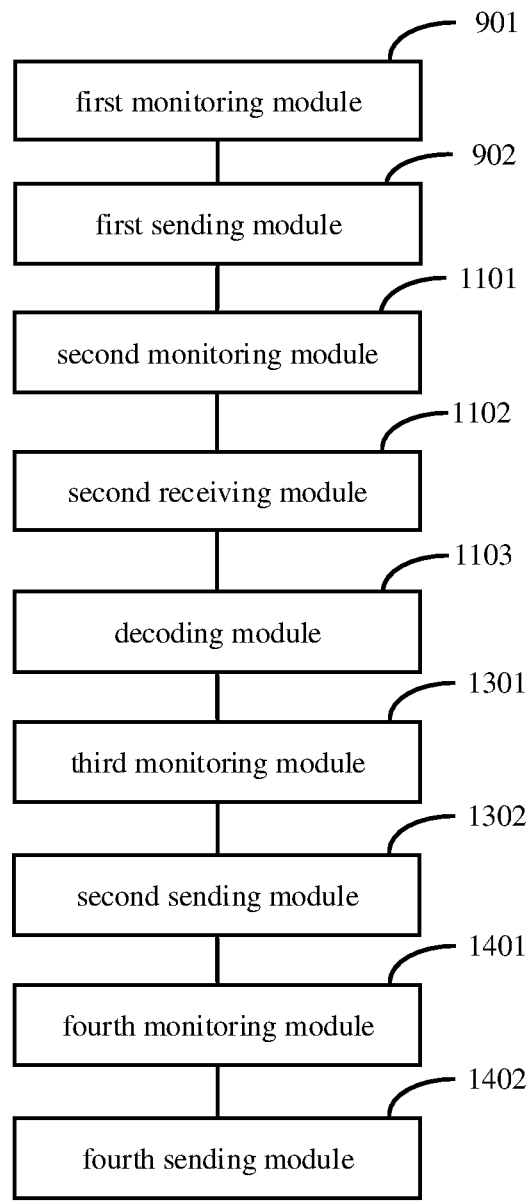
FIG. 14 is a block diagram illustrating an apparatus for processing random access according to an example embodiment.

In an embodiment, as illustrated in FIG. 14, the apparatus further includes a fourth monitoring module 1401 and a fourth receiving module 1402.

The fourth monitoring module 1401 is configured to monitor a random response message 4 sent by the base station side on at least one carrier of a pre-configured fourth carrier group.

The fourth receiving module 1402 is configured to receive the random response message 4 on the carrier in the fourth carrier group, the random response message 4 including a cell radio network temporary identifier (C-RNTI).

Figure 15:
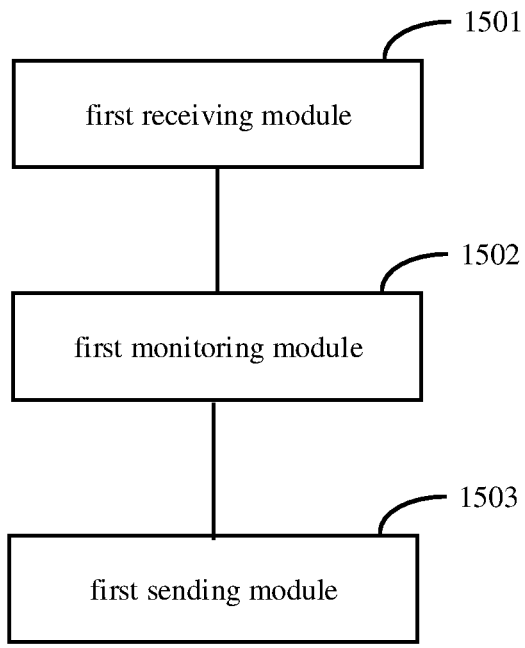
FIG. 15 is a block diagram illustrating an apparatus for processing random access according to an example embodiment.

FIG. 15 is a block diagram illustrating an apparatus for processing random access according to an example embodiment. The apparatus may be implemented as part or all of an electronic device in software, hardware or a combination thereof, which is applied to a base station side. Referring to FIG. 15, the apparatus for processing random access includes a first receiving module 1501, a first monitoring module 1502, and a first sending module 1503.

The first receiving module 1501 is configured to receive a random access preamble sent from a user device through a time-frequency resource for a physical random access channel PRACH on a carrier in a pre-configured first carrier group, to obtain a random access request, wherein the first carrier group includes at least two carriers.

The first monitoring module 1502 is configured to monitor whether time-frequency resources for a random access response RAR message are idle on at least one carrier of a pre-configured second carrier group.

The first sending module 1503 is configured to send the RAR in an idle time-frequency resource for the RAR when the idle time-frequency resource for the RAR exists.

Figure 16:
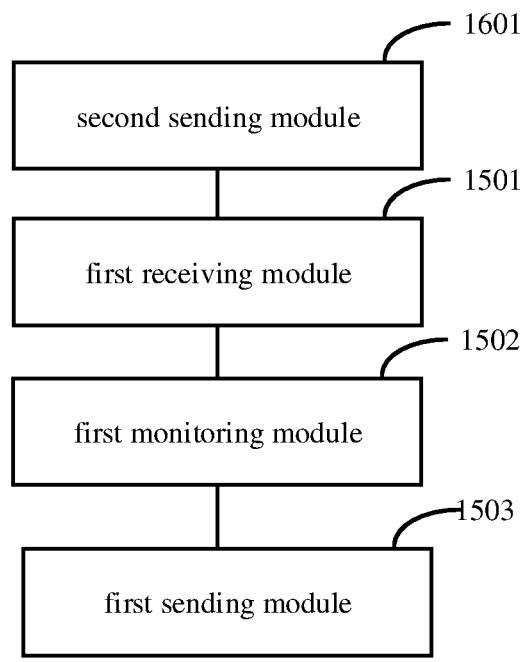
FIG. 16 is a block diagram illustrating an apparatus for processing random access according to an example embodiment.

In an embodiment, as illustrated in FIG. 16, the apparatus further includes a second sending module 1601.

The second sending module 1601 is configured to send a first system information block to the user device, the first system information block including indication information of the first carrier group and indication information of the time-frequency resources for the PRACH on at least one carrier of the first carrier group.

Figure 17:
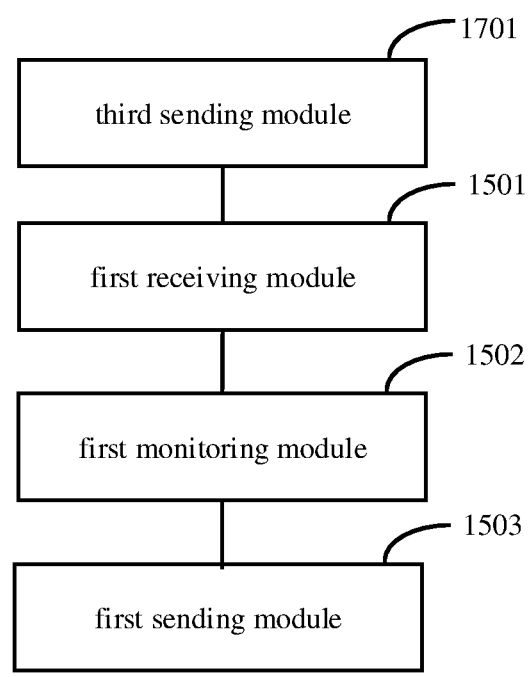
FIG. 17 is a block diagram illustrating an apparatus for processing random access according to an example embodiment.

In an embodiment, as illustrated in FIG. 17, the apparatus further includes a third sending module 1701.

The third sending module 1701 is configured to send a second system information block to the user device, the second system information block including indication information of the second carrier group.

In an embodiment, the second system information block further includes indication information of time-frequency resources for the RAR.

In an embodiment, the RAR includes indication information of the time-frequency resources for a random response message 3 on at least one carrier of a third carrier group.

Figure 18:
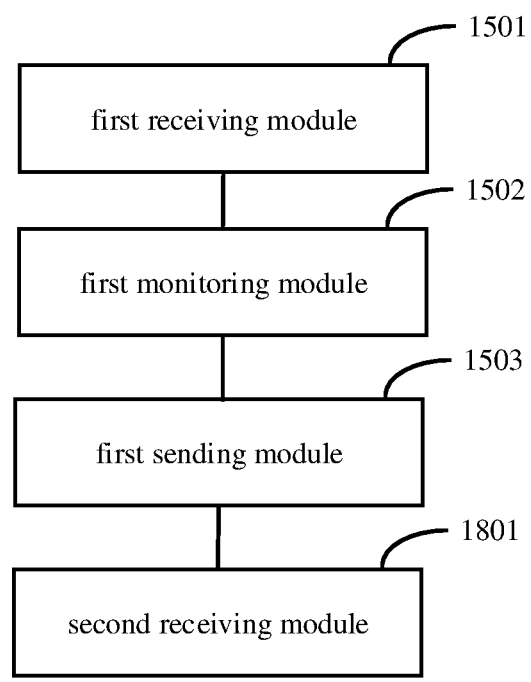
FIG. 18 is a block diagram illustrating an apparatus for processing random access according to an example embodiment.

In an embodiment, as illustrated in FIG. 18, the device further includes a second receiving module 1801.

The second receiving module 1801 is configured to receive the random response message 3 sent from the user device on the carrier in the third carrier group.

Figure 19:
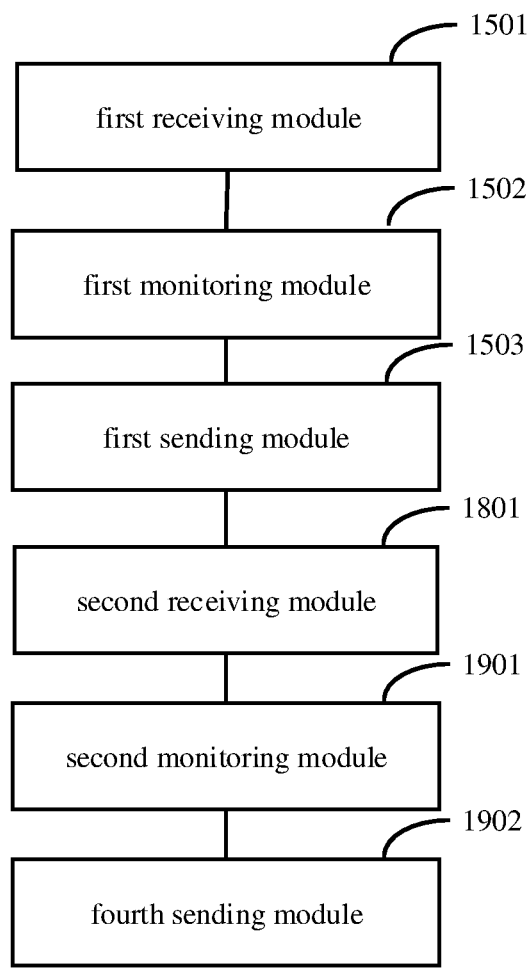
FIG. 19 is a block diagram illustrating an apparatus for processing random access according to an example embodiment.

In an embodiment, as illustrated in FIG. 19, the apparatus further includes a second monitoring module 1901 and a fourth sending module 1902.

The second monitoring module 1901 is configured to monitor whether time-frequency resources for a random response message 4 are idle on at least one carrier of a pre-configured fourth carrier group.

The fourth sending module 1902 is configured to send the random response message 4 on an idle time-frequency resource for the random response message 4 when the idle time-frequency resource for the random response message 4 exists, the random response message 4 including a cell radio network temporary identifier (C-RNTI).

Regarding the apparatus in the above embodiments, the specific manner in which each module performs operations has been described in detail in the method embodiments, which are not described in detail here.

Figure 20:
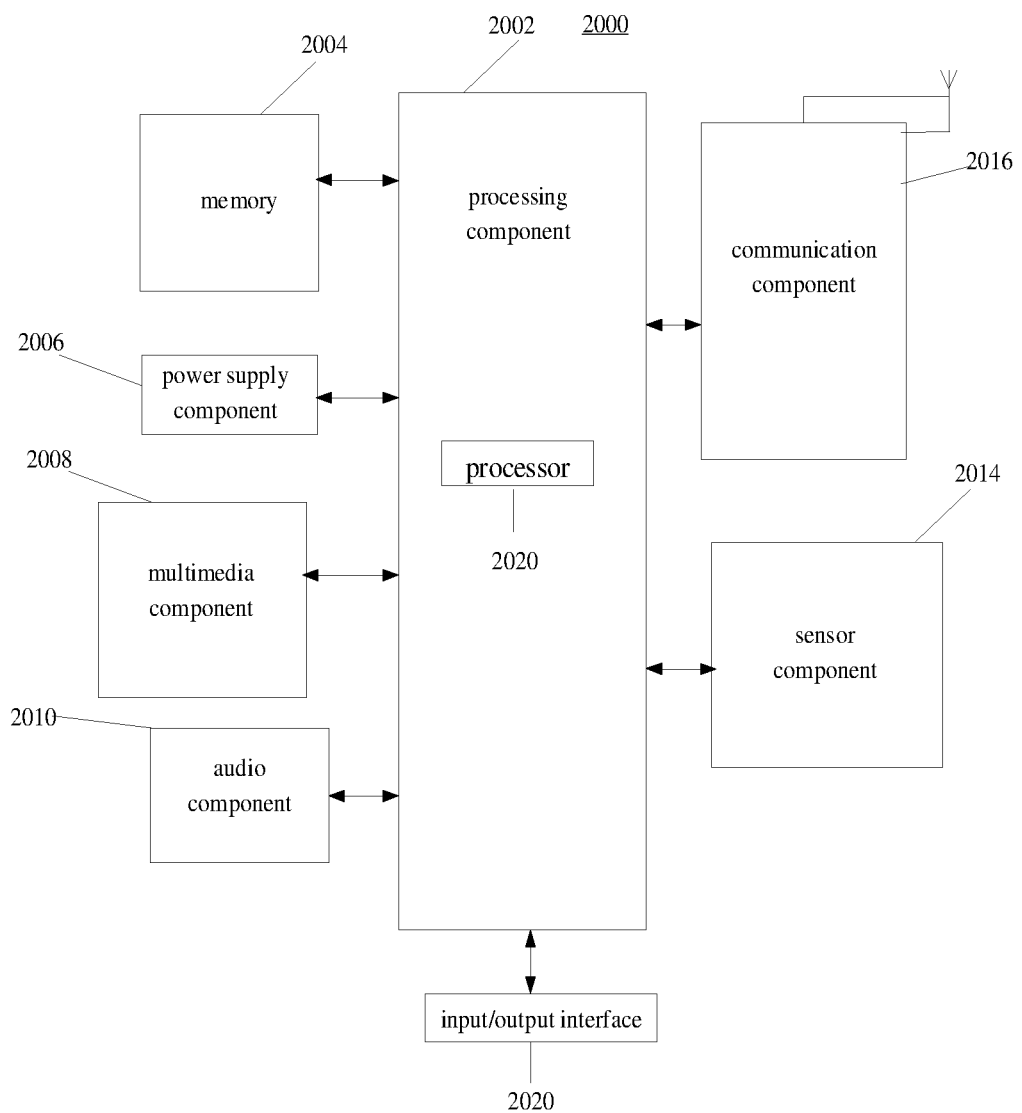
FIG. 20 is a block diagram illustrating a device suitable for processing random access according to an example embodiment.

FIG. 20 is a block diagram illustrating a device for processing random access according to an example embodiment. For example, the device 2000 may be a mobile phone, a computer, a digital broadcasting terminal, a messaging device, a game console, a tablet device, a medical device, a fitness equipment, a personal digital assistant, etc.

The device 2000 may include one or more of the following components: a processing component 2002, a memory 2004, a power supply component 2006, a multimedia component 2008, an audio component 2010, an input/output (I/O) interface 2020, a sensor component 2014, and a communication component 2016.

The processing component 2002 generally controls the overall operations of the device 2000, such as operations associated with display, telephone calls, data communications, camera operations, and recording operations. The processing element 2002 may include one or more processors 2020 to execute instructions to complete all or part of the steps of the above method. In addition, the processing component 2002 may include one or more modules to facilitate the interaction between the processing component 2002 and other components. For example, the processing component 2002 may include a multimedia module to facilitate the interaction between the multimedia component 2008 and the processing component 2002.

The memory 2004 is configured to store various types of data to support operations in the device 2000. Examples of these data include instructions for any application or method operating on the device 2000, contact data, phone book data, messages, pictures, videos, etc. The memory 2004 may be implemented by any type of volatile or non-volatile storage device or their combination, such as a static random access memory (SRAM), an electrically erasable programmable read-only memory (EEPROM), an erasable and Programmable read only memory (EPROM), a programmable read only memory (PROM), a read only memory (ROM), a magnetic memory, a flash memory, a magnetic or optical disk.

The power supply component 2006 provides power to various components of the device 2000. The power supply component 2006 may include a power management system, one or more power supplies, and other components associated with generating, managing, and distributing power for the device 2000.

The multimedia component 2008 includes a screen that provides an output interface between the device 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may not only sense the boundary of the touch or slide action, but also detect the duration and pressure related to the touch or slide operation. In some embodiments, the multimedia component 2008 includes a front camera and/or a rear camera. When the device 2000 is in an operation mode, such as a shooting mode or a video mode, the front camera and/or the rear camera may receive external multimedia data. Each front camera and rear camera may be a fixed optical lens system or have focal length and optical zooming capabilities.

The audio component 2010 is configured to output and/or input audio signals. For example, the audio component 2010 includes a microphone (MIC), and when the device 2000 is in an operation mode, such as a calling mode, a recording mode, and a voice recognition mode, the microphone is configured to receive external audio signals. The received audio signals may be further stored in the memory 2004 or transmitted via the communication component 2016. In some embodiments, the audio component 2010 further includes a speaker for outputting audio signals.

The I/O interface 2020 provides an interface between the processing component 2002 and a peripheral interface module. The peripheral interface module may be a keyboard, a click wheel, a button, and the like. These buttons may include but are not limited to: a home button, a volume button, a start button, and a lock button.

The sensor assembly 2014 includes one or more sensors for providing the device 2000 with various aspects of state evaluation. For example, the sensor component 2014 may detect the opening/closing status of the device 2000 and the relative positioning of the components. For example, the component is a display and a keypad of the device 2000, and the sensor component 2014 may also detect the position changes of the device 2000 or one component of the device 2000, a presence or absence of contact between the user and the device 2000, an orientation or an acceleration/deceleration of the device 2000, and the temperature changes of the device 2000. The sensor assembly 2014 may include a proximity sensor configured to detect the presence of nearby objects when there is no physical contact. The sensor component 2014 may also include a light sensor, such as a CMOS or CCD image sensor, for use in imaging applications. In some embodiments, the sensor component 2014 may also include an acceleration sensor, a gyroscope sensor, a magnetic sensor, a pressure sensor or a temperature sensor.

The communication component 2016 is configured to facilitate a wired or wireless communication between the device 2000 and other devices. The device 2000 may access a wireless network based on a communication standard, such as WiFi, 2G or 3G, or a combination thereof. In an example embodiment, the communication component 2016 receives a broadcast signal or broadcast related information from an external broadcast management system via a broadcast channel. In an example embodiment, the communication component 2016 further includes a near field communication (NFC) module to facilitate a short-range communication. For example, the NFC module may be implemented based on radio frequency identification (RFID) technology, an infrared data association (IrDA) technology, an ultra-wideband (UWB) technology, a Bluetooth (BT) technology and other technologies.

In an example embodiment, the device 2000 may be implemented by one or more application specific integrated circuits (ASIC), digital signal processors (DSP), digital signal processing equipment (DSPD), programmable logic devices (PLD), a field programmable gate array (FPGA), a controller, a microcontroller, a microprocessor or other electronic components, to implement the methods described above.

In an example embodiment, a non-transitory computer-readable storage medium including instructions is also provided, such as a memory 2004 including instructions, which may be executed by the processor 2020 of the device 2000 to complete the foregoing method. For example, the non-transitory computer-readable storage medium may be a ROM, a random access memory (RAM), a CD-ROM, a magnetic tape, a floppy disk, an optical data storage device, etc.

In an example embodiment, an apparatus for processing random access is provided, including:
a processor:
a memory for storing processor executable instructions:
wherein the processor is configured to:
monitor whether time-frequency resources for transmitting a physical random access channel (PRACH) are idle on at least one carrier of a pre-configured first carrier group, wherein the first carrier group includes at least two carriers; and
send a random access preamble on an idle time-frequency resource for the PRACH when the idle time-frequency resource for the PRACH exists, to request random access.

The above processor may be further configured to:
before monitoring whether the time-frequency resources for transmitting the PRACH are idle, receive a first system information block sent by a base station side, the first system information block including indication information of the first carrier group and indication information of the time-frequency resources for the PRACH on the at least one carrier of the first carrier group.

The above processor may be further configured to:
monitor a random access response (RAR) message sent by a base station side on at least one carrier of a pre-configured second carrier group, wherein the second carrier group includes at least two carriers;
receive the RAR on the carrier of the second carrier group; and
decode the RAR with a random access radio network temporary identifier (RA-RNTI), wherein the RA-RNTI is determined based on the idle time-frequency resource for the PRACH and the carrier where the idle time-frequency resource for the PRACH is located.

The above processor may be further configured to:
before monitoring the RAR message sent by the base station side, receive a second system information block sent from the base station side, the second system information block including indication information of the second carrier group.

The second system information block may further include indication information of time-frequency resources for the RAR.

The RAR may include indication information of time-frequency resources for a random response message 3 on at least one carrier of a third carrier group.

The above processor may be further configured to:
monitor whether time-frequency resources for transmitting the random response message 3 are idle on the at least one carrier of the third carrier group; and
send the random response message 3 on an idle time-frequency resource for the random response message 3 when the idle time-frequency resource for the random response message 3 exists.

The above processor may be further configured to:
monitor a random response message 4 sent by the base station side on at least one carrier of a pre-configured fourth carrier group; and
receive the random response message 4 on the carrier of the fourth carrier group, the random response message 4 including a cell radio network temporary identifier (C-RNTI).

A non-transitory computer-readable storage medium is provided. When instructions in the storage medium are executed by a processor of the device, the device may be caused to execute the above method for processing random access. The method includes:
monitoring whether time-frequency resources for transmitting a physical random access channel (PRACH) are idle on at least one carrier of a pre-configured first carrier group, wherein the first carrier group includes at least two carriers; and
sending a random access preamble on an idle time-frequency resource for the PRACH when the idle time-frequency resource for the PRACH exists, to request the random access.

Before monitoring whether the time-frequency resources for transmitting the PRACH are idle, the method may further include:

receiving a first system information block sent from a base station side, the first system information block including indication information of the first carrier group and indication information of the time-frequency resources for the PRACH on the at least one carrier of the first carrier group.

The method may further include:

monitoring a random access response (RAR) message sent by a base station side on at least one carrier of a pre-configured second carrier group, wherein the second carrier group includes at least two carriers;

receiving the RAR on the carrier of the second carrier group; and decoding the RAR with a random access radio network temporary identifier (RA-RNTI), wherein the RA-RNTI is determined based on the idle time-frequency resource for the PRACH and the carrier where the idle time-frequency resource for the PRACH is located.

Before monitoring the RAR message sent by the base station side, the method may further include:

receiving a second system information block sent from the base station side, the second system information block including indication information of the second carrier group.

The second system information block may further include indication information of time-frequency resources for the RAR.

The RAR may include indication information of time-frequency resources for a random response message 3 on at least one carrier of a third carrier group.

The method may further include:

monitoring whether time-frequency resources for transmitting the random response message 3 are idle on the at least one carrier of the third carrier group; and sending the random response message 3 on the idle time-frequency resource for the random response message 3 when the idle time-frequency resource for the random response message 3 exists.

The method may further include:

monitoring a random response message 4 sent by the base station side on at least one carrier of a pre-configured fourth carrier group; and receiving the random response message 4 on the carrier of the fourth carrier group, the random response message 4 including a cell radio network temporary identifier (C-RNTI).

Figure 21:
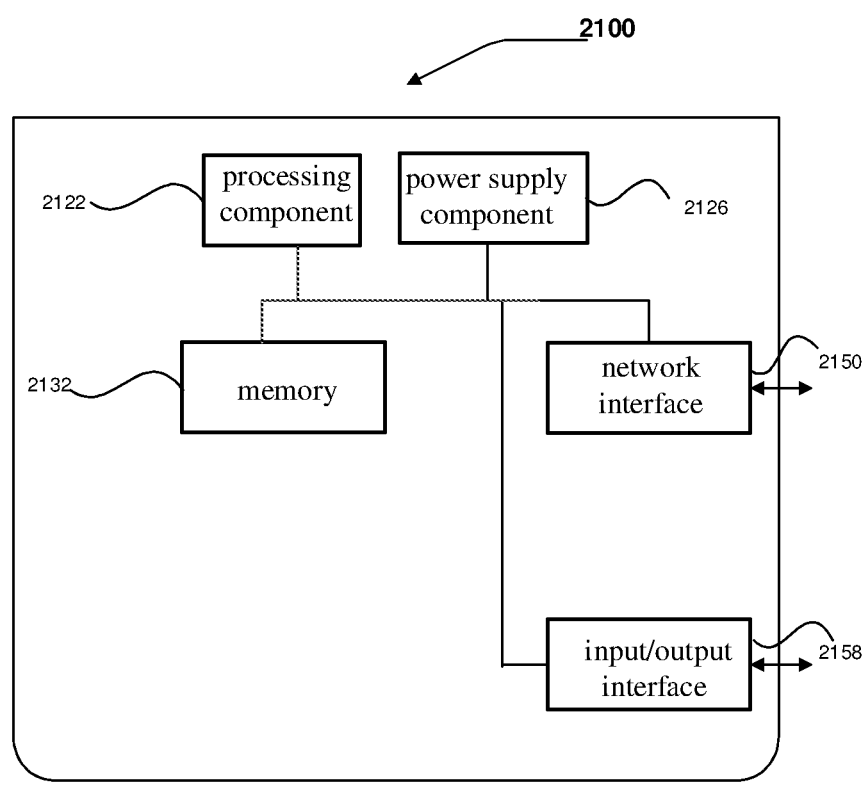
FIG. 21 is a block diagram illustrating a device suitable for processing random access according to an example embodiment.

FIG. 21 is a block diagram illustrating a device 2100 for synchronizing data according to an example embodiment. For example, the device 2100 may be provided as a computer. Referring to FIG. 21, the device 2100 includes a processing component 2122, which further includes one or more processors, and a memory resource represented by a memory 2132 for storing instructions executable by the processing component 2122, such as application programs. The application programs stored in the memory 2132 may include one or more modules each corresponding to a set of instructions. In addition, the processing component 2122 is configured to execute instructions to perform the above method to synchronize data.

The device 2100 may also include a power supply component 2126 configured to perform power management of the device 2100, a wired or wireless network interface 2150 configured to connect the device 2100 to the network, and an input/output (I/O) interface 2158. The device 2100 may operate based on an operating system stored in the memory 2132, such as Windows Server™, Mac OS X™, Unix™, Linux™, FreeBSD™ or the like.

In an example embodiment, a device for processing random access is provided, including:

a processor; and a memory configured to store instructions executable by the processor;

wherein the processor is configured to:

receive a random access preamble sent from a user device through a time-frequency resource for a physical random access channel (PRACH) on a carrier in a pre-configured first carrier group, to obtain a random access request, wherein the first carrier group includes at least two carriers;

monitor whether time-frequency resources for a random access response RAR message are idle on at least one carrier of a pre-configured second carrier group; and send the RAR on the idle time-frequency resource for the RAR when the idle time-frequency resources for the RAR exist.

The above processor may be further configured to:

before receiving the random access preamble sent from the user device, send a first system information block to the user device, the first system information block including indication information of the first carrier group and indication information of the time-frequency resources for PRACH on at least one carrier of the first carrier group.

The above processor may be further configured to:

before monitoring whether time-frequency resources for the RAR message are idle, sending a second system information block to the user device, the second system information block including indication information of the second carrier group.

The second system information block may further include indication information of the time-frequency resources for RAR.

The RAR may include indication information of time-frequency resources for a random response message 3 on at least one carrier of a third carrier group.

The above processor may be further configured to:

receive the random response message 3 sent from the user device on the carrier of the third carrier group.

The above processor may be further configured to:

monitor whether time-frequency resources for a random response message 4 are idle on at least one carrier of a pre-configured fourth carrier group; and send the random response message 4 on the idle time-frequency resource for the random response message 4 when the idle time-frequency resources of random response message 4 exist, the random response message 4 including a cell radio network temporary identifier (C-RNTI).

A non-transitory computer-readable storage medium is provided. When instructions in the storage medium are executed by a processor of the device, the device may be caused to execute the above method for processing random access. The method includes:

receiving a random access preamble sent from a user device through a time-frequency resource for a physical random access channel (PRACH) on a carrier of a pre-configured first carrier group, to obtain a random access request, wherein the first carrier group includes at least two carriers;

monitoring whether time-frequency resources for a random access response (RAR) message are idle on at least one carrier of a pre-configured second carrier group; and sending the RAR on an idle time-frequency resource for the RAR when the idle time-frequency resources for the RAR exist.

Before receiving the random access preamble sent from the user device, the method may further include:

sending a first system information block to the user device, the first system information block including indication information of the first carrier group and indication information of the time-frequency resources for PRACH on at least one carrier of the first carrier group.

Before monitoring whether time-frequency resources for the RAR message are idle, the method may further include:

sending a second system information block to the user device, the second system information block including indication information of the second carrier group.

The second system information block may further include indication information of time-frequency resources for RAR.

The RAR may include indication information of time-frequency resources for a random response message 3 on at least one carrier of a third carrier group.

The method may further include:

receiving the random response message 3 sent from the user device on the carrier of the third carrier group.

The method may further include:

monitoring whether time-frequency resources for a random response message 4 are idle on at least one carrier of a pre-configured fourth carrier group; and sending the random response message 4 on an idle time-frequency resource for the random response message 4 when the idle time-frequency resources for the random response message 4 exist, the random response message 4 including a cell radio network temporary identifier (C-RNTI).

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims.

It should be understood that the present invention is not limited to the precise structure described above and shown in the drawings, and various modifications and changes may be made without departing from its scope. The scope of the present application is only limited by the appended claims.

What is claimed is:

1. A method for processing random access, applied to a user device, comprising:

randomly selecting at least one carrier from a pre-configured first carrier group, wherein carriers in the first carrier group are configured for time-frequency resources for a physical random access channel (PRACH);

monitoring whether the time-frequency resources for the PRACH are idle on the randomly selected at least one carrier, wherein the first carrier group comprises at least two carriers; and in response to an idle time-frequency resource for the PRACH existing, sending a random access preamble on the idle time-frequency resource for the PRACH to request the random access; and determining a random access radio network temporary identifier (RA-RNTI) based on the idle time-frequency resource for the PRACH and the randomly selected at least one carrier where the idle time-frequency resource for the PRACH is located;

wherein before monitoring whether the time-frequency resources for the PRACH are idle, the method further comprises:

receiving a first system information block sent by a base station, the first system information block comprising indication information of the first carrier group and indication information of the time-frequency resources for the PRACH on the at least one carrier of the first carrier group; and the method further comprises:

monitoring a random access response (RAR) sent by the base station on at least one carrier of a pre-configured second carrier group, wherein the second carrier group comprises at least two carriers;

receiving the RAR on one of the at least one carrier of the second carrier group; and decoding the RAR with the RA-RNTI.

2. The method of claim 1, wherein before monitoring the RAR sent by the base station, the method further comprises:

receiving a second system information block sent by the base station, the second system information block comprising indication information of the second carrier group.

3. The method of claim 2, wherein the second system information block further comprises indication information of time-frequency resources for the RAR.

4. The method of claim 1, wherein the RAR comprises indication information of time-frequency resources for a random response message 3 on at least one carrier of a third carrier group.

5. The method of claim 4, further comprising:

monitoring whether the time-frequency resources for the random response message 3 are idle on the at least one carrier of the third carrier group; and sending the random response message 3 on an idle time-frequency resource for the random response message 3 in response to the idle time-frequency resource for the random response message 3 existing.

6. The method of claim 5, further comprising:

monitoring a random response message 4 sent by the base station on at least one carrier of a pre-configured fourth carrier group; and receiving the random response message 4 on the at least one carrier of the fourth carrier group, the random response message 4 comprising a cell radio network temporary identifier (C-RNTI).

7. A non-transitory computer-readable storage medium having computer instructions stored thereon, wherein when the instructions are executed by a processor, the method of claim 1 is performed.

8. A method for processing random access, applied to a base station, comprising:

receiving a random access preamble sent by a user device through a time-frequency resource for a physical random access channel (PRACH) on a carrier of a pre-configured first carrier group, to obtain a random access request, wherein the first carrier group comprises at least two carriers, carriers in the first carrier group are configured for time-frequency resources for the PRACH, and the carrier of the first carrier group is randomly selected by the user device and time-frequency resources on the carrier of the first carrier group are idle;

monitoring whether time-frequency resources for a random access response (RAR) are idle on at least one carrier of a pre-configured second carrier group; and sending the RAR on an idle time-frequency resource for the RAR in response to the idle time-frequency resource for the RAR existing;

wherein before receiving the random access preamble sent by the user device, the method further comprises:

sending a first system information block to the user device, the first system information block comprising indication information of the first carrier group and indication information of time-frequency resources for the PRACH on at least one carrier of the first carrier group, wherein:

the user device randomly selects at least one carrier from the first carrier group;

monitors whether the time-frequency resources for the PRACH are idle on the randomly selected at least one carrier;

in response to an idle time-frequency resource for the PRACH existing, sends the random access preamble on the idle time-frequency resource for the PRACH to request the random access, and determines a random access radio network temporary identifier (RA-RNTI) based on the idle time-frequency resource for the PRACH and the randomly selected at least one carrier where the idle time-frequency resource for the PRACH is located;

monitors the RAR sent by the base station on at least one carrier of the pre-configured second carrier group, wherein the second carrier group comprises at least two carriers;

receives the RAR on one of the at least one carrier of the second carrier group; and decodes the RAR with the RA-RNTI.

9. The method of claim 8, wherein before monitoring whether the time-frequency resources for the RAR are idle, the method further comprises:

sending a second system information block to the user device, the second system information block comprising indication information of the second carrier group.

10. The method of claim 9, wherein the second system information block further comprises indication information of the time-frequency resources for the RAR.

11. The method of claim 8, wherein the RAR comprises indication information of time-frequency resources for a random response message 3 on at least one carrier of a third carrier group.

12. The method of claim 11, further comprising:

receiving the random response message 3 sent by the user device on the at least one carrier of the third carrier group.

13. The method of claim 12, further comprising:

monitoring whether time-frequency resources for a random response message 4 are idle on at least one carrier of a pre-configured fourth carrier group; and sending the random response message 4 on an idle time-frequency resource for the random response message 4 in response to the idle time-frequency resource for the random response message 4 existing, the random response message 4 comprising a cell radio network temporary identifier (C-RNTI).

14. A device for processing random access, comprising:
a processor; and
a memory configured to store instructions executable by the processor;
wherein the processor is configured to perform the method of claim 8.

15. A non-transitory computer-readable storage medium having computer instructions stored thereon, wherein when the instructions are executed by a processor, the method of claim 8 is performed.

16. A device for processing random access, comprising:
a processor; and
a memory configured to store instructions executable by the processor;
wherein the processor is configured to:

randomly select at least one carrier from a pre-configured first carrier group, wherein carriers in the first carrier group are configured for time-frequency resources for a physical random access channel (PRACH);

monitor whether the time-frequency resources for the PRACH are idle on the randomly selected at least one carrier, wherein the first carrier group comprises at least two carriers;

send a random access preamble in an idle time-frequency resource for the PRACH in response to the idle time-frequency resource for the PRACH existing, to request the random access; and determine a random access radio network temporary identifier (RA-RNTI) based on the idle time-frequency resource for the PRACH and the randomly selected at least one carrier where the idle time-frequency resource for the PRACH is located;

wherein before monitoring whether the time-frequency resources for the PRACH are idle, the processor is further configured to:

receive a first system information block sent by a base station, the first system information block comprising indication information of the first carrier group and indication information of the time-frequency resources for the PRACH on the at least one carrier of the first carrier group; and the processor is further configured to:

monitor a random access response (RAR) sent by the base station on at least one carrier of a pre-configured second carrier group, wherein the second carrier group comprises at least two carriers;

receive the RAR on one of the at least one carrier of the second carrier group; and decode the RAR with the RA-RNTI.

* * * * *